United States Patent
Noda et al.

(10) Patent No.: US 7,376,261 B2
(45) Date of Patent: May 20, 2008

(54) SURFACE SCAN MEASURING DEVICE AND METHOD OF FORMING COMPENSATION TABLE FOR SCANNING PROBE

(75) Inventors: Takashi Noda, Utsunomiya (JP); Katsuyuki Ogura, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 606 days.

(21) Appl. No.: 10/995,730

(22) Filed: Nov. 22, 2004

(65) Prior Publication Data

US 2005/0111725 A1   May 26, 2005

(30) Foreign Application Priority Data

Nov. 25, 2003  (JP) .............................. 2003-393677

(51) Int. Cl.
*G06K 9/00* (2006.01)
(52) U.S. Cl. .......................... 382/152; 33/503; 33/551; 33/555; 33/556; 250/559.22; 250/559.29; 702/168
(58) Field of Classification Search ................ 382/141, 382/152; 702/167, 168; 33/503, 551, 555, 33/556; 250/559.22, 559.29
See application file for complete search history.

(56) References Cited

U.S. PATENT DOCUMENTS

| | | | |
|---|---|---|---|
| 4,991,304 A | | 2/1991 | McMurtry |
| 5,402,981 A | * | 4/1995 | McMurtry ................... 248/638 |
| 5,428,548 A | * | 6/1995 | Pilborough et al. .......... 700/195 |
| 5,778,551 A | * | 7/1998 | Herklotz et al. ............... 33/554 |
| 5,953,127 A | * | 9/1999 | Washio et al. ............... 356/634 |
| 6,543,150 B2 | * | 4/2003 | Matsumiya et al. ........... 33/553 |
| 6,806,968 B2 | * | 10/2004 | Ruck ........................... 356/623 |
| 7,039,550 B2 | * | 5/2006 | Noda ........................... 702/168 |
| 7,068,026 B2 | * | 6/2006 | Kanematsu ................ 324/158.1 |
| 7,100,429 B2 | * | 9/2006 | Matsuki et al. ................ 73/105 |
| 2005/0111725 A1 | * | 5/2005 | Noda et al. .................. 382/141 |
| 2005/0263727 A1 | * | 12/2005 | Noda .................... 250/559.29 |

FOREIGN PATENT DOCUMENTS

JP   H05-256640   10/1993
JP   2003-50118   2/2003

OTHER PUBLICATIONS

WO 00/25087, Calibrations of an Analogue Probe and Error Mapping, Publication Date—May 4, 2000.

* cited by examiner

*Primary Examiner*—Gregory M Desire
(74) *Attorney, Agent, or Firm*—Rankin, Hill & Clark LLP

(57) ABSTRACT

A measuring system includes a coordinate measuring machine for driving a scanning probe and a host computer. The host computer includes a compensation table (53) and a profile analysis unit (54). The compensation table stores, as compensation data, compensation coefficients to correct counter values of a probe counter (415), and compensation radiuses "r" to the workpiece surface concerning central coordinate values of a contact portion, for respective contact directions. The profile analysis unit has a contact direction calculation unit (542), a compensation data selection unit (543), a compensation calculation unit (544). The contact direction calculation unit calculates the contact direction along which the scanning probe comes into contact with a workpiece W, and the compensation data selection unit selects compensation data set up in the compensation table based on thus calculated contact direction.

8 Claims, 19 Drawing Sheets

FIG.2

COMPENSATION TABLE

| | COMPENSATION COEFFICIENTS | | | COMPENSATION RADIUSES "r" |
|---|---|---|---|---|
| | $K_{xp}$ | $K_{yp}$ | $K_{zp}$ | |
| $P_1$ | ○○○ | △△△ | □□□ | ××× |
| $P_2$ | ... | ... | ... | ... |
| $P_3$ | ... | ... | ... | ... |
| ⋮ | ⋮ | ⋮ | ⋮ | ⋮ |
| $P_{29}$ | ... | ... | ... | ... |

FIG.5
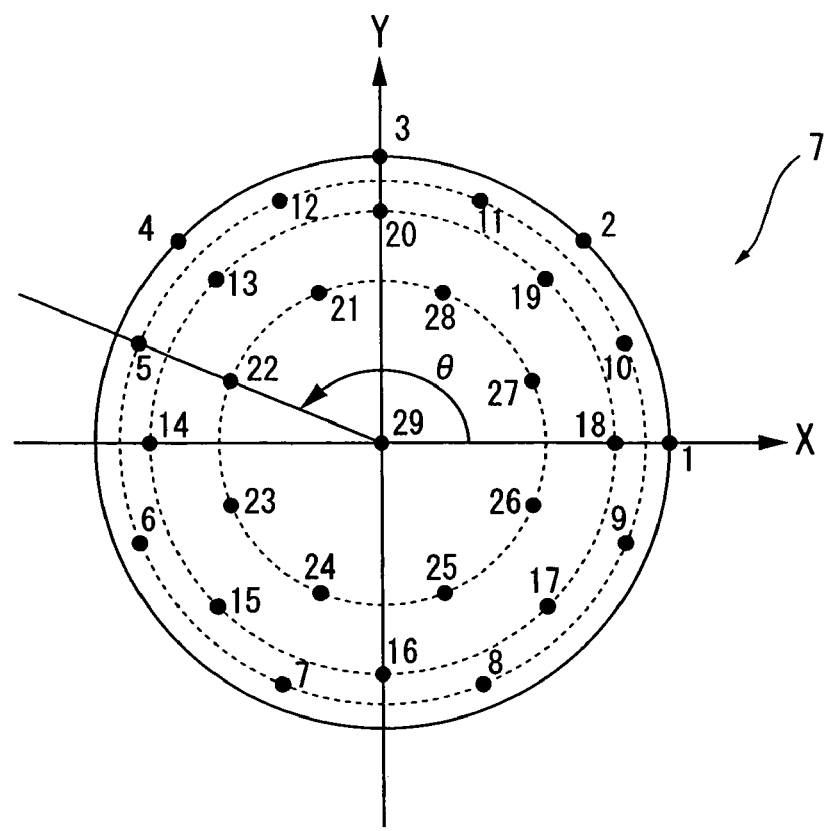
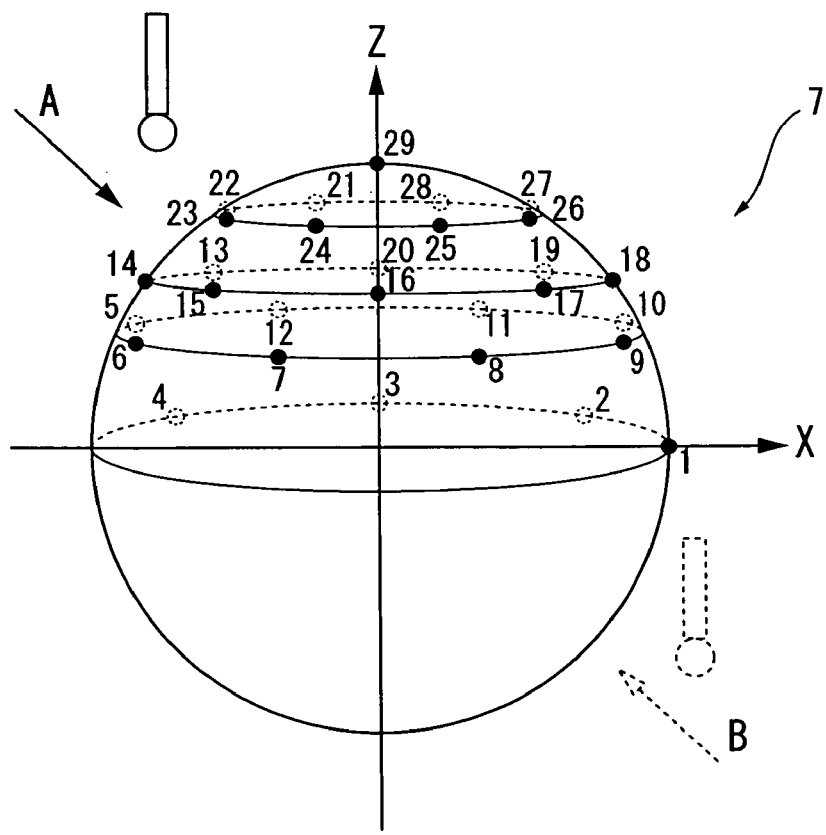

SURFACE SCAN MEASURING DEVICE AND METHOD OF FORMING COMPENSATION TABLE FOR SCANNING PROBE

BACKGROUND OF THE INVENTION

1. Field of the Invention

The present invention relates to a surface scan measuring device, and a method of forming a compensation table for a scanning probe. More particularly, the present invention relates to a surface scan measuring device that scans the surface of a workpiece to measure surface roughness, waviness, profile, etc. of the workpiece.

2. Description of Related Art

There are diffused surface scan measuring devices that scan the surface of a workpiece to measure surface texture and three-dimensional profile of the workpiece, and there are known a machine for measuring surface roughness, a machine for measuring profile, a roundness measuring machine, and a coordinate measuring machine.

FIG. 17 shows a schematic view of a conventional measuring system 100 that is a surface scan measuring device using a scanning probe.

The measuring system 100 includes a coordinate measuring machine 1 for moving a scanning probe 2, an operation unit 3 having a joystick 31 for use in manual operation, a motion controller 4 for controlling the operation of the coordinate measuring machine 1, a host computer 5 for operating the coordinate measuring machine 1 through the motion controller 4 and processing measured data of a workpiece W obtained by the coordinate measuring machine 1 to obtain dimensions and profile of the workpiece W.

The scanning probe 2 has a stylus 21 whose leading end is provided with a contact portion (measuring piece) 22, and a holding portion 23 that slidably holds the basal end of the stylus 21 along Xp direction, Yp direction, Zp direction within a predetermined range, as shown in FIG. 18.

The holding portion 23 has a slide mechanism, not shown, which is provided with an xp slider, a yp slider, and a zp slider that can slide along directions perpendicular to each other, and a probe sensor 24 (shown in FIG. 1) that detects displacements of the slide mechanism along respective axis directions and outputs thus detected displacements. The stylus 21 is slidably held by the slide mechanism in a predetermined range on the basis of the holding portion 23.

The configuration of the scanning probe is disclosed in Japanese Patent Laid-Open Publication No. JP05-256640.

Thus configured scanning probe 2 is made to scan the surface of a workpiece with its contact portion 22 abutting on the surface of the workpiece by a reference displacement amount Δr.

At this time, a motion trajectory of the scanning probe 2 is obtained using drive amount of the coordinate measuring machine 1. The motion trajectory of the scanning probe 2 corresponds to a motion trajectory of the contact portion 22, and the contact point between the workpiece surface and the contact portion 22 is located at a position offset from the center of the contact portion 22 by radius "r" of the contact portion 22.

The scanning probe 2 is made to scan the surface of the workpiece with its contact portion 22 pressed to the workpiece surface by the reference displacement amount Δr.

FIG. 19A and FIG. 19B show views for explaining the state in which the contact portion 22 is pressed to a workpiece W by the reference displacement amount Δr. FIG. 19A shows the state in which the contact portion 22 is in contact with workpiece W, and the reference displacement amount Δr is zero. In this state, the distance between the center P1 of the contact portion 22 and the abutting point of the workpiece W is equal to the radius "r" of the contact portion 22. In this case, since the reference displacement amount Δr is zero, it is not determined whether or not the contact portion 22 of the scanning probe 2 is in contact with workpiece W.

FIG. 19B shows the state in which the contact portion 22 of the scanning probe 2 is pressed to the workpiece W so that the reference displacement amount Δr is set to be a predetermined value. In this case, since the contact portion 22 is pressed to the workpiece W with a pressure determined by a measuring force, the stylus 21 is bent.

Consequently, the distance between the center P2 of the contact portion 22 and the abutting point of the workpiece W is equal to the radius "r" of the contact portion 22, which is similar to the case shown in FIG. 19A. On the other hand, the distance between the detecting position of the probe sensor 24 (a position shifted by the reference displacement amount Δr as compared with the case shown in FIG. 19A, or the apparent center P3 of the contact portion) and the abutting point of the workpiece W is set to be an offset value Q, which value is different from the radius "r" of the contact portion 22. Accordingly, the offset value Q is different from the radius "r" of the contact portion 22 due to above-described flexure of the stylus 21 and, other than this, the influence of the sphericity of the contact portion 22.

When a motion trajectory drawn by the apparent center P3 of the contact portion is corrected by the offset value Q toward the workpiece surface, the surface profile of the workpiece can be obtained.

The reference displacement amount Δr is not required to be the same value all the time, and may be within a proper reference position range in the measurable range of the probe sensor 24.

There are raised errors in detecting displacements of the stylus 21 by the probe sensor. Then, errors are brought about in the displacement amount, which leads to measurement errors. So as to correct detection errors by the probe sensor, compensation coefficients are set up depending on the detection property of the respective axes (Xp direction, Yp direction, Zp direction). For example, a compensation coefficient of Kxp' is set up for the Xp direction, a compensation coefficient of Kyp' is set up for the Yp direction, and a compensation coefficient of Kzp' is set up for the Zp direction. When detected values of the respective axes by the probe sensor are Xp, Yp and Zp the detected values Xp, Yp and Zp by the probe sensor are corrected as follows.

$$Xd = Xp \cdot Kxp'$$

$$Yd = Yp \cdot Kyp'$$

$$Zd = Zp \cdot Kzp'$$

The Xd, Yd and Zd are values obtained by correcting output values of the probe sensor using the compensation coefficients Kxp', Kyp' and Kzp'.

However, in some cases, detection errors cannot be sufficiently corrected by only setting up the compensation coefficients Kxp', Kyp' and Kzp' for the respective axes, and correcting output values of the probe sensor using the compensation coefficients. Consequently, when measuring a perfect circle, the measurement result may come to an ellipse due to measurement errors. That is, detection errors cannot be sufficiently corrected by only multiplying the detected values by the compensation coefficients set up for the respective axes.

Furthermore, in some cases, the surface profile of the workpiece cannot be obtained accurately by correcting the motion trajectory drawn by the apparent center P3 of the contact portion by the offset value Q alone. The cause of the errors is attributed to the flexure of the stylus 21 brought about when the contact portion 22 of the scanning probe 2 is pressed to the workpiece W. That is, it is thought that the offset value Q varies when the stylus 21 is bent.

Because of the problem, profile measurement by the surface scan measuring device includes errors and the errors cannot be sufficiently corrected, which leads to difficulty in improving accuracy of profile measurement.

SUMMARY OF THE INVENTION

It is therefore an object of the present invention to overcome the above-mentioned drawbacks by providing a surface scan measuring device that can measure the surface profile of a workpiece with high accuracy, and a method of forming a compensation table for a scanning probe to measure the surface profile of a workpiece with high accuracy.

The surface scan measuring device according to the present invention comprises a scanning probe having a measuring piece brought into contact with or close to a workpiece surface and a detection sensor for detecting the relative position between the measuring piece and the workpiece surface, the scanning probe scanning the workpiece surface in the state in which the relative position between the measuring piece and the workpiece surface is kept in a preset reference position range, a motion section which relatively moves the scanning probe along the workpiece surface, a drive sensor for detecting drive amount of the motion section, and an analysis section which analyzes the profile of the workpiece based on detected values by the detection sensor and the drive sensor; wherein the analysis section is provided with a compensation table stored with compensation data to correct detected values obtained by the detection sensor for respective directions along which the measuring piece measures the workpiece surface when the scanning probe scans the workpiece surface.

In the above arrangement, the scanning probe scans, driven by the motion section, the workpiece along the surface of the workpiece in the state in which the relative position between the scanning probe and the workpiece surface is kept in the reference position range. When scanning the workpiece surface by the scanning probe, the drive amount of the motion section is detected by the drive sensor. The detected values obtained by the detection sensor are corrected by the compensation data corresponding to the direction of the measuring piece relative to the surface of the workpiece. The detected values of the drive sensor and the detection sensor are analyzed and processed by the analysis section, and thereby the surface profile of the workpiece is obtained.

The compensation table is stored with the compensation data for each measurement direction, in which the measuring piece measures the surface of the workpiece. Accordingly, even if detection error is caused in the probe sensor depending on the direction of the measuring piece relative to the surface of the workpiece, sensor output can be corrected depending on the contact direction. As the result, coordinate values of the workpiece surface can be accurately obtained regardless of the directions of the measuring piece relative to the surface of the workpiece, and therefore the profile of the workpiece can be accurately obtained.

Incidentally, the compensation table can be stored in a removable storage element to allow to be exchanged.

Herein, the scanning probe can scan the workpiece surface with its measuring piece abutting on the surface of the workpiece. For example, the scanning probe can scan the workpiece surface in the state in which the measuring piece thereof is pressed to the workpiece by a reference amount (reference position). the scanning probe also can scan the workpiece surface without contacting the measuring piece thereof to the workpiece surface. As the example of such a non-contact scanning probe, there are CCD camera, image sensor, capacitance type scanning probe, electromagnetic induction-type scanning probe or the like.

In the surface scan measuring device according to the present invention, the compensation table is preferred to have compensation coefficients to correct detected values obtained by the detection sensor for respective directions along which the measuring piece measures the workpiece surface when the scanning probe scans the workpiece surface; and the analysis section is preferred to have a measurement direction calculation section which calculates the measurement direction along which the measuring piece measures the workpiece surface based on detected values obtained by the detection sensor, a compensation data selection section which selects, based on the measurement direction calculated by the measurement direction calculation section, the compensation coefficient corresponding to the measurement direction from the compensation table as compensation data, and a detection sensor value compensation section which corrects detected values detected by the detection sensor by multiplying detected values obtained by the detection sensor by the compensation data selected by the compensation data selection section.

In the above arrangement, after the detected values obtained by the detection sensor are output to the measurement direction calculation section, vector of the measurement direction is calculated in the measurement direction calculation section from the output values of the detection sensor. Based on the calculated vector of the measurement direction, the compensation coefficient is selected from the compensation table by the compensation data selection section. At this time, since the compensation table is stored with compensation coefficients respectively corresponding to each measurement direction, the compensation data selection section can select the compensation coefficient corresponding to the measurement direction calculated by the measurement direction calculation section.

The selected compensation coefficient is multiplied by, for example, the detection sensor value. Thereby the detection sensor value is corrected, and the relative position between the workpiece surface and the measuring piece is accurately obtained by the corrected detection sensor value. Thereby the profile of the workpiece surface can be accurately obtained.

Since the compensation table is stored with compensation coefficients respectively corresponding to each measurement direction, and the detected values obtained by the detection sensor are corrected corresponding to the measurement direction, the profile of the workpiece can be accurately obtained regardless of the direction along which the measuring piece measures the workpiece.

Herein, in the case where the arrangement includes, for example, a counter for counting sensor signal of the detection sensor, the compensation coefficient for correcting the count values of the counter is included in the "compensation coefficients to correct detected values obtained by the detection sensor".

In the surface scan measuring device according to the present invention, the compensation table is preferred to have offset values from the reference point of the measuring piece to the workpiece surface for respective directions along which the measuring piece measures the workpiece surface when the scanning probe scans the workpiece surface; and the analysis section is preferred to have a measurement direction calculation section which calculates the measurement direction along which the measuring piece measures the workpiece surface based on detected values obtained by the detection sensor, a compensation data selection section which selects, based on the measurement direction calculated by the measurement direction calculation section, the offset value corresponding to the measurement direction from the compensation table as compensation data, and a measurement point calculation section which, using the compensation data selected by the compensation data selection section, shifts coordinate values of the reference point along the measurement direction by the compensation data to obtain the workpiece surface.

Herein, the reference point of the measuring piece indicates the position detected by the detection sensor of the scanning probe.

In the above arrangement, after the detected value of the detection sensor is output to the measurement direction calculation section, the vector of the measurement direction is calculated in the measurement direction calculation from the output value of the detection sensor. Based on the calculated vector of the measurement direction, the offset value is selected from the compensation table by the compensation data selection section. At this time, since the compensation table is stored with the offset values for each measurement direction, the compensation data selection section selects the offset value corresponding to the measurement direction calculated by the measurement direction calculation.

The selected offset value is added to (or reduced from), for example, the reference coordinate values of the measuring piece. The profile of the workpiece surface is obtained at the point when the workpiece surface fall into the position where it is formed by offsetting the reference coordinate values of the measuring piece toward the measurement direction by offset value.

Since the compensation table is stored with offset values for each measurement direction, and the offset value is selected corresponding to the each different measurement direction, the profile of the workpiece surface can be accurately obtained regardless of the direction along which the measuring piece measures the workpiece surface.

In the surface scan measuring device according to the present invention, it is preferred that the compensation data selection section selects, from measurement directions set up in the compensation table, a direction that makes the absolute value of the inner product with a vector of the measurement direction calculated by the measurement direction calculation section largest.

According to the above arrangement, the direction most closely parallel to the measurement direction calculated by the measurement direction calculation can be selected. Further, since the absolute value of the inner product is used, even in the reversed direction, the direction most closely parallel to the measurement direction can be selected. Accordingly, the direction set in the compensation table may only cover half instead of all the directions.

In the surface scan measuring device according to the present invention, it is preferred that the compensation table is set up for respective measuring pieces.

According to the above arrangement, in the case where a scanning probe provided with a plurality of the measuring pieces is used to measure the workpiece surface, since the measurement can be carried out using the optimal measuring piece depending on the measurement direction, and the detected value can be corrected by using the compensation table corresponding to the measuring piece, the measurement can be carried out with high flexibility and high accuracy.

Further, in the case where the scanning probe or the measuring piece are exchangeable, since the detected value can be corrected by using the compensation table corresponding to the exchanged measuring piece, the measurement can be carried out with high flexibility and high accuracy.

In the surface scan measuring device according to the present invention, it is preferred that the compensation table is arranged in the scanning probe.

According to the above arrangement, since the compensation table is arranged in the scanning probe, when the scanning probe is exchanged, the optimal compensation data can be obtained by readout the compensation table value from the scanning probe. Accordingly, no confusion on compensation data selecting will occur, therefore the management of the compensation data is made easy.

Herein, the compensation table can be stored in a nonvolatile storage, or the compensation table can be stored in a removable storage element to allow to be exchanged.

The method of forming a compensation table for a scanning probe according to the present invention is a method which corrects sensor outputs being output from a detection sensor of a scanning probe that has a measuring piece brought into contact with or close to a workpiece surface, and a detection sensor for detecting the relative position between the measuring piece and the workpiece surface, the scanning probe scanning the workpiece surface in the state in which the relative position between the measuring piece and the workpiece surface is kept in a preset reference position range; the method comprising: a compensation point setting up step of setting up a plurality of compensation points each having given coordinate values on the spherical surface of a master ball that is a perfect sphere having given radius and central coordinate values, a compensation point detection step of making the measuring piece relatively move toward the respective compensation points along the direction coming from the respective compensation points and going to the center of the master ball so as to detect the position of the compensation points when the relative position between the measuring piece and the compensation points is within a reference position range, a compensation data calculation step of calculating compensation data to correct output values of the detection sensor by contrasting output values of the detection sensor in the compensation point detection step with coordinate values of the compensation points, and a compensation table forming step of forming a table that stores the compensation data calculated in the compensation data calculation step by making the compensation data correspond to the direction coming from the compensation points and going to the center of the measuring piece.

According to the above arrangement, by setting up compensation points on the spherical surface of a master ball, and obtaining compensation data for each respective compensation point, the necessary compensation data for all directions can be obtained.

Herein, the compensation data calculation step is preferred to have a compensation coefficient calculation step for calculating the compensation coefficient for correcting the detected value obtained by detection sensor. Further, the compensation data calculation step is preferred to have an offset value calculation step for calculating the offset value from the reference point of the measuring piece (namely, the position detected by the detection sensor) to the workpiece surface.

Further, the compensation points can be set on a hemisphere only. As to the other hemisphere, the set compensation data can be applied to the parallel but reversed measurement direction.

The method of forming a compensation table for a scanning probe according to the present invention is a method which corrects sensor outputs being output from a detection sensor of a scanning probe that has a measuring piece brought into contact with or close to a workpiece surface, and a detection sensor for detecting the relative position between the measuring piece and the workpiece surface, the scanning probe scanning the workpiece surface in the state in which the relative position between the measuring piece and the workpiece surface is kept in a preset reference position range; the method comprising: a compensation point setting up step of setting up a plurality of compensation points on a reference gauge which has a given shape, a compensation point detection step of making the measuring piece relatively move toward the respective compensation points so as to detect the position of the compensation points when the relative position between the measuring piece and the compensation points is within a reference position range; a compensation data calculation step of calculating compensation data to correct output values of the detection sensor by contrasting output values of the detection sensor in the compensation point detection step with coordinate values of the compensation points, and a compensation table forming step of forming a table that stores the compensation data calculated in the compensation data calculation step; wherein in the compensation point setting up step, a designated measuring direction, along which the workpiece is measured, is preset, and the number of the compensation points set in the designated measuring direction is larger than other direction; and wherein in the compensation data calculation step, the compensation data, which make the square sum of the measurement errors of the measured values least, are calculated.

According to the above arrangement, the compensation table corresponding to the preset designated measurement direction, which is the direction along which the workpiece surface is measured, can be obtained.

For example, in the case where the profile of the cross-section of the workpiece sectioned on the X-Y plane is measured, the measurement direction of workpiece (designated measurement direction) is perpendicular to Z-axis. At this time, when forming a compensation table, lots of compensation points are set on the line intersected with the X-Y plane (compensation point setting up step).

The set compensation points are detected by the scanning probe (compensation point detection step), the compensation data which make the square sum of the measurement errors of the measured values least are obtained (compensation data calculation step). Accordingly, the compensation data that strongly reflect the influence of the compensation points set in the designated measurement direction can be obtained, a large number of compensation points being set in the designated measurement direction.

By measuring the workpiece in the designated measurement direction, and correcting the detected value of the scanning probe by using the compensation data obtained corresponding to the designated measurement direction, the profile of the workpiece in the designated measurement direction can be accurately measured.

Incidentally, in the compensation point setting up step, the meaning of "the number of the compensation points set in the designated measuring direction is larger than other direction" includes the case where the compensation points are only set in the designated measuring direction.

Further, the reference gauge can be, for example, a master ball having given radius, or have other shape. For example, in the case where the designated measurement direction is included on a plane (that perpendicular to an axis), a ring-shaped gauge can be used as the reference gauge.

In the above, the analysis section can be constituted by a computer which includes a CPU (central processing unit), a memory and the like, and functions as, by being incorporated therein with predetermined program, a compensation table, a measurement direction calculation section, a compensation data selection section, a detection sensor value compensation section, and a measurement point calculation section. Further, such a progam can be installed via a communication means such as the Internet, etc., or a recording medium such as CD-ROM, memory card, etc. Further, when installing the predetermined program, recording medium such as CD-ROM, memory card can be directly inserted into the electronic device, or a device for reading the recording medium can be connected from outside. Further, the program can be provided and installed via communication with LAN cable, telephone line, etc., or the program can be provided and installed via radio communication.

BRIEF DESCRIPTION OF THE DRAWINGS

FIG. 2 shows a view indicative of the configuration of a compensation table in the first embodiment;

FIG. 5 shows an example of grid points set up on the spherical surface of a master ball in the second embodiment;

DETAILED DESCRIPTION OF THE PREFERRED EMBODIMENTS

Embodiments of the present invention will be described below with reference to the accompanying drawings.

First Embodiment

A first embodiment of the surface scan measuring device according to the present invention will be explained.

Figure 1:
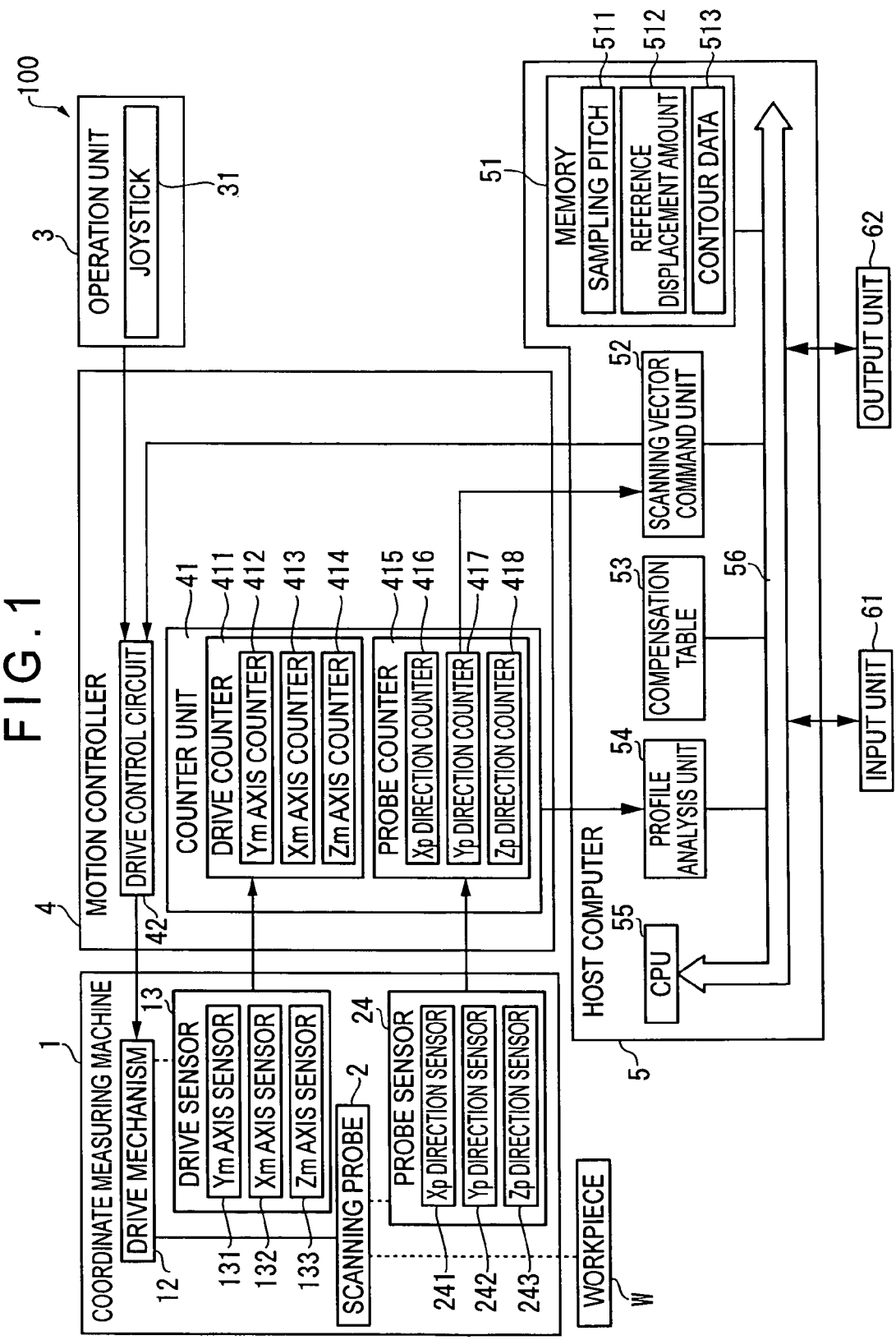
FIG. 1 shows a block diagram of a measuring system as the surface scan measuring device according to the present invention in the first embodiment.
Figure 17:
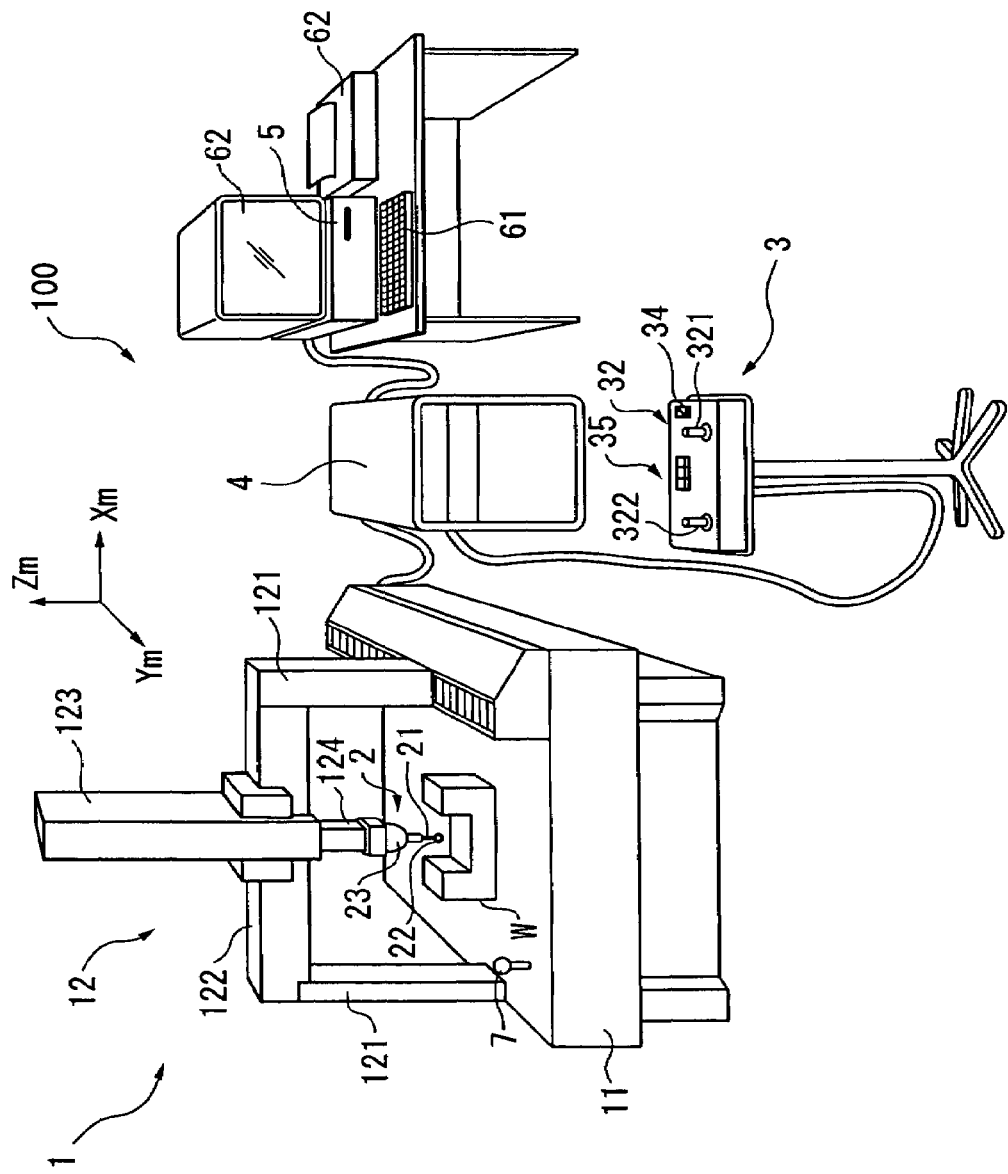
FIG. 17 shows a schematic view of a conventional measuring system that is a surface scan measuring device using a scanning probe.
Figure 18:
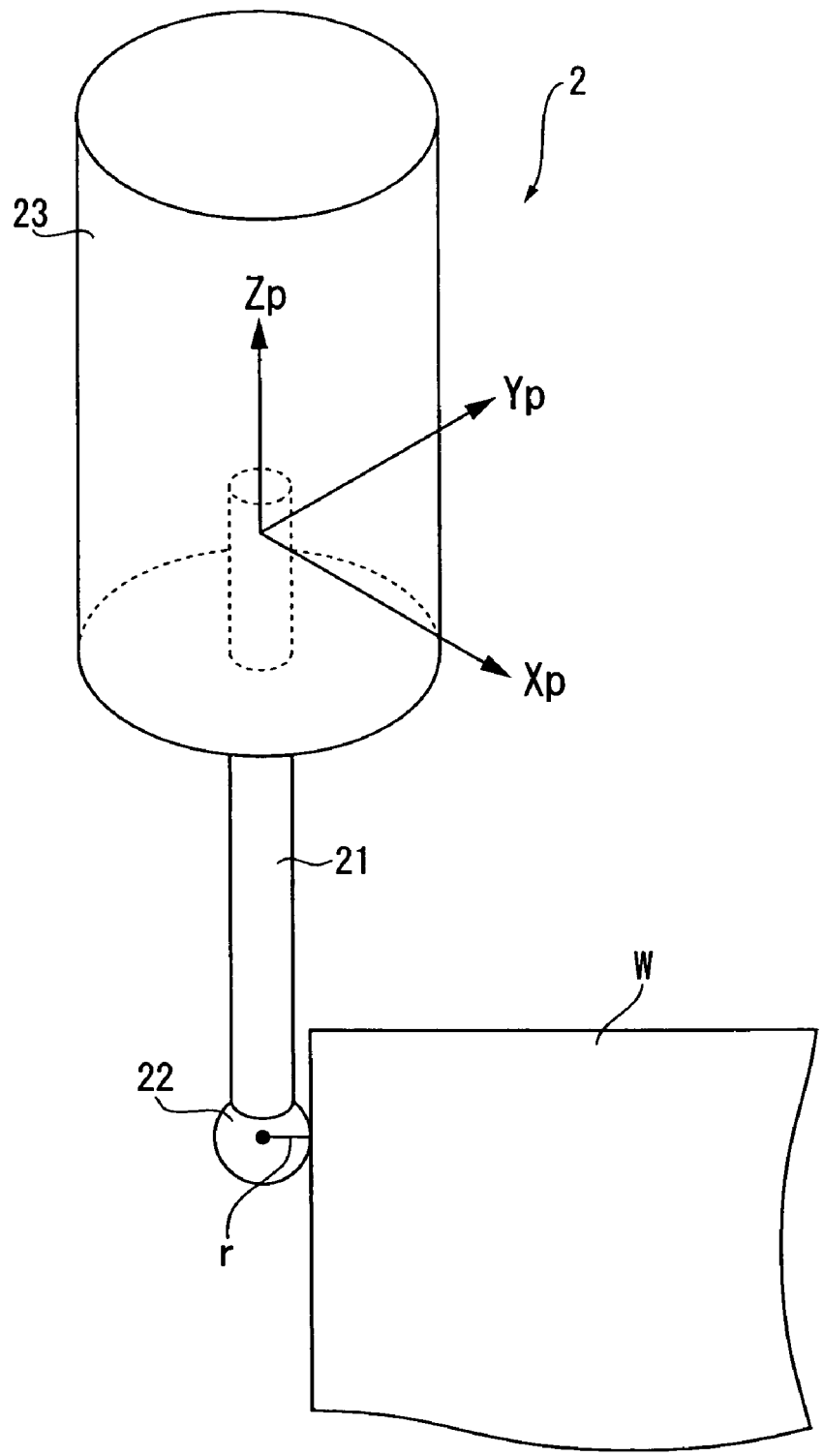
FIG. 18 shows a schematic view of a scanning probe.
Figure 19A:
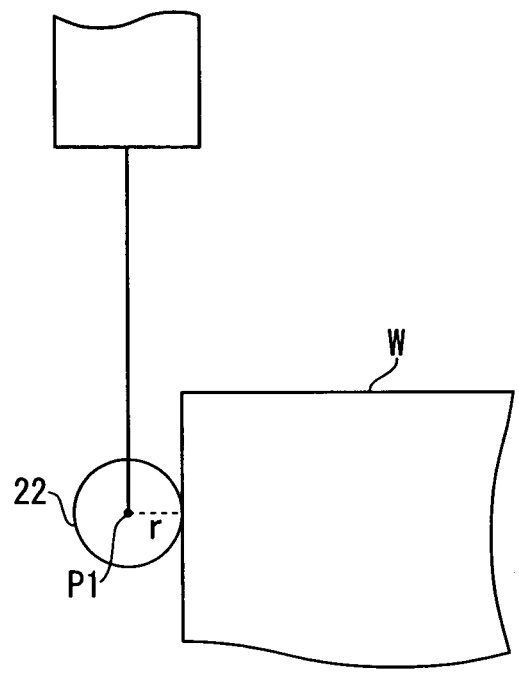
FIG. 19A and FIG. 19B show views for explaining the state in which a contact portion is pressed to a workpiece by a reference displacement amount Δr, and show an offset value Q from the apparent center of the contact portion to the workpiece.
Figure 19B:
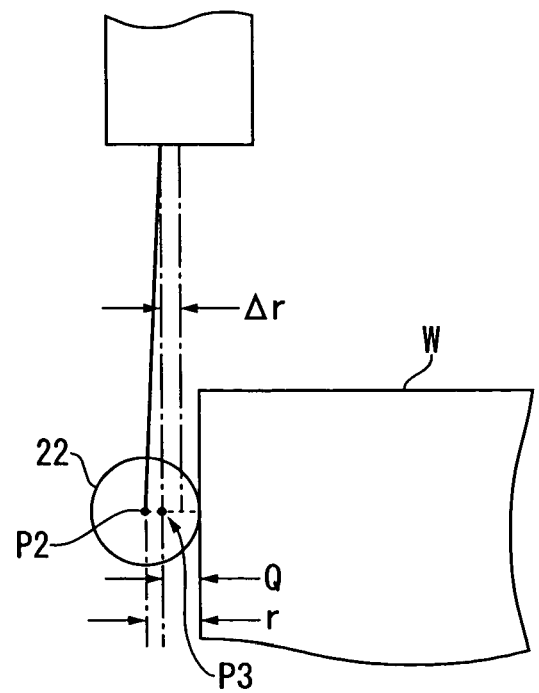

FIG. 17 shows a schematic view of a measuring system that is a surface scan measuring device using a scanning probe, while FIG. 1 shows a block diagram of a measuring system 100.

The measuring system 100, whose configuration is similar to that described in the description of related art, includes a coordinate measuring machine 1, an operation unit 3 for manually operating the coordinate measuring machine 1, a motion controller 4 for controlling and driving the coordinate measuring machine 1, a host computer 5 for issuing predetermined commands to the motion controller 4 and performing arithmetic processing such as profile analysis of a workpiece W, an input unit 61 for inputting measurement conditions etc., and an output unit 62 for outputting measurement results.

The coordinate measuring machine 1 has a measuring base 11, a drive mechanism (slide unit) 12 that is mounted on the measuring base 11 and three-dimensionally moves a scanning probe 2, and a drive sensor 13 (shown in FIG. 1) that detects drive amount of the drive mechanism 12.

The drive mechanism 12 has two beam-supporting pillars 121 that extend from both sides of the measuring base 11 along a direction substantially perpendicular to the surface of the measuring base 11 or Zm axis direction and can slide across both sides of the measuring base 11 along Ym axis direction, a beam 122 that extends along Xm axis direction whose both ends are supported by the upper ends of the beam-supporting pillars 121, a column 123 that is slidably attached to the beam 122 along the Xm axis direction and has guides along the Zm axis direction, and a spindle 124 that is slidably arranged inside the column 123 along the Zm axis direction whose lower end holds the scanning probe 2.

The Xm axis direction, Ym axis direction, and Zm axis direction of the drive mechanism 12 define a machine coordinate system. The Xm axis, Ym axis, and Zm axis of the drive mechanism 12 are drive axes that are perpendicular to each other, and the beam-supporting pillars 121, column 123, and spindle 124 form a slide unit.

As shown in FIG. 1, the drive sensor 13 has a Ym axis sensor 131 for detecting the shift of the beam-supporting pillars 121 along the Ym direction, an Xm axis sensor 132 for detecting the shift of the column 123 along the Xm direction, and a Zm axis sensor 133 for detecting the shift of the spindle 124 along the Zm direction. Detection results by the drive sensor 13 are output to the host computer 5 through the motion controller 4.

The scanning probe 2 has a stylus 21 whose leading end is provided with a contact portion (measuring piece) 22, and a holding portion 23 that slidably holds the basal end of the stylus 21 along Xp direction, Yp direction, Zp direction within a predetermined range.

The contact portion 22 is formed into substantially a perfect sphere of radius "r".

The holding portion 23 has a slide mechanism, not shown, which is provided with an xp slider, a yp slider, and a zp slider that can shift along directions perpendicular to each other, and a probe sensor (detection sensor) 24 that detects displacements of the slide mechanism along the respective axis directions and outputs thus detected displacements. The stylus 21 is slidably held by the slide mechanism in a predetermined range on the basis of the holding portion 23.

The probe sensor 24 has an Xp direction sensor 241 for detecting the shift of the stylus 21 along the Xp direction, a Yp direction sensor 242 for detecting the shift of the stylus 21 along the Yp direction, and a Zp direction sensor 243 for detecting the shift of the stylus 21 along the Zp direction, as shown in FIG. 1. Displacements of the stylus 21 detected by the probe sensor 24 are output to the host computer 5 through the motion controller 4.

The Xp direction, Yp direction, and Zp direction of the slide mechanism define a probe coordinate system.

The operation unit 3 has a tiltable joystick 31 for use as a manual operation unit that is arranged on an operation panel and is to be manually operated to move the scanning probe 2. The operation unit 3 has a detection unit, not shown, that detects the operation of the joystick 31 such as inclination angle of the joystick 31, and signals from the detection unit are output to the motion controller 4.

The motion controller 4 has a counter unit 41 for counting detection signals from the drive sensor 13 and the probe sensor 24, and a drive control circuit (drive control unit) 42 for controlling and driving the drive mechanism 12 in response to commands from the host computer 5 and the operation unit 3.

The counter unit 41 has a drive counter 411 for counting pulse signals output from the drive sensor 13 to measure drive amount of the drive mechanism 12, and a probe counter 415 for counting pulse signals output from the probe sensor 24 to measure slide amount of the stylus 21 as a displacement amount.

The drive counter 411 has a Ym axis counter 412 for counting outputs from the Ym axis sensor 131, an Xm axis counter 413 for counting outputs from the Xm axis sensor 132, and a Zm axis counter 414 for counting outputs from the Zm axis sensor 133.

The probe counter 415 has an Xp direction counter 416 for counting outputs from the Xp direction sensor 241, a Yp direction counter 417 for counting outputs from the Yp direction sensor 242, and a Zp direction counter 418 for counting outputs from the Zp direction sensor 243.

Counter values (Xm, Ym, Zm) by the drive counter 411 and counter values (Xp, Yp, Zp) by the probe counter 415 are output to the host computer 5, respectively.

The host computer 5 has a memory (storage device) 51 for storing measurement conditions etc. that are input to be set up by the input unit 61, a scanning vector command unit 52 for issuing scanning vector commands of motion direction and motion velocity in scanning the surface of a workpiece, a compensation table 53 that stores compensation data set up with regard to direction along which the scanning probe 2 comes into contact with the workpiece W, a profile analysis unit 54 for analyzing the profile of the workpiece W, a central processing unit (CPU) 55 that has a calculation equipment and storage devices (ROM, RAM) and executes predetermined programs and processes data, and a bus 56 for connecting the memory 51, scanning vector command unit 52, compensation table 53, profile analysis unit 54, and central processing unit 55.

The memory 51 stores measurement conditions etc. that are input to be set up by the input unit 61, specifically, stores interval (sampling pitch 511) to sample drive amount of the drive mechanism 12 during scanning operation, a displacement amount Δr (reference displacement amount 512) by which the contact portion 22 presses the workpiece W, and contour data 513 that comes from the design data of the workpiece W.

The scanning vector command unit 52 issues vector commands to scan the workpiece W based on the contour data 513 etc. stored in the memory 51. Furthermore, the scanning vector command unit 52 issues vector commands along the displacement direction for setting the displacement amount to be the reference displacement amount Δr within a predetermined range (reference position range) based on outputs of the probe counter 415. Vector commands issued by the scanning vector command unit 52 are output to the drive control circuit 42.

As shown in FIG. 2, the compensation table 53 stores compensation data to correct counter values of the probe counter 415 to be coordinate values of the workpiece surface with respect to directions (P1 to P29) along which the scanning probe 2 comes into contact with the workpiece W.

The compensation table 53 stores, as compensation data, compensation coefficients (Kxp, Kyp, Kzp) to correct counter values of the probe counter 415, and compensation radiuses "r" (offset values Q) to the workpiece surface concerning (apparent) central coordinate values of the contact portion 22.

That is, in the compensation table 53, the compensation coefficients (Kxp, Kyp, Kzp) are set up by which the counter values (Xp, Yp, Zp) of the probe counter 415 are multiplied for the respective axes to correct the counter values of the respective axes.

Furthermore, in the compensation table 53, the compensation radiuses "r" (offset values Q) are set up which are added to (or subtracted from) the (apparent) central coordinate values of the contact portion 22 along the normal line of the workpiece surface to correct the central coordinate values of the contact portion 22 to be the coordinate values of the workpiece surface.

The compensation table 53 stores the compensation coefficients (Kxp, Kyp, Kzp) and compensation radiuses "r" for predetermined plural directions (P1 to P29), along which the contact portion 22 is made to come into contact with the workpiece surface. It is desired that the directions (P1 to P29) set up in the compensation table 53 be extracted evenly from all the directions along which the contact portion 22 may come into contact with the workpiece surface when measuring the workpiece W. Otherwise, concerning directions which are opposite to each other, the compensation coefficients and the compensation radius are considered to be equal with each other, and compensation coefficients as well as compensation radius for one of the directions may be stored.

Figure 4:
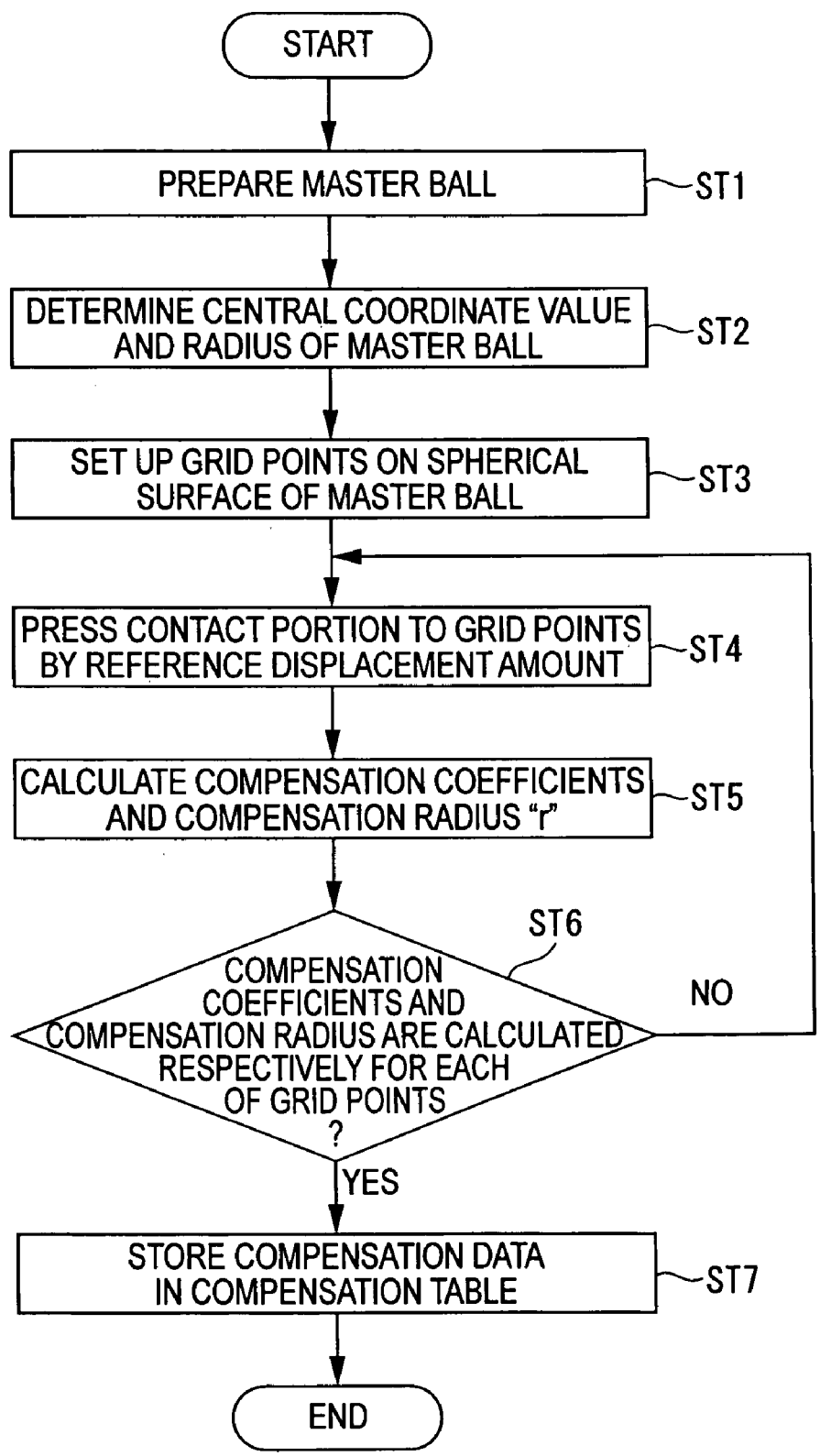
FIG. 4 shows a flow chart of the method of forming a compensation table of a scanning probe according to the present invention in the second embodiment.

The process of forming the compensation table 53 will be explained in the second embodiment with reference to FIG. 4, FIG. 5 and FIG. 6.

The profile analysis unit 54 analyzes the profile of the workpiece surface based on the counter values by the counter unit 41 and the compensation data set up in the compensation table 53.

Figure 3:
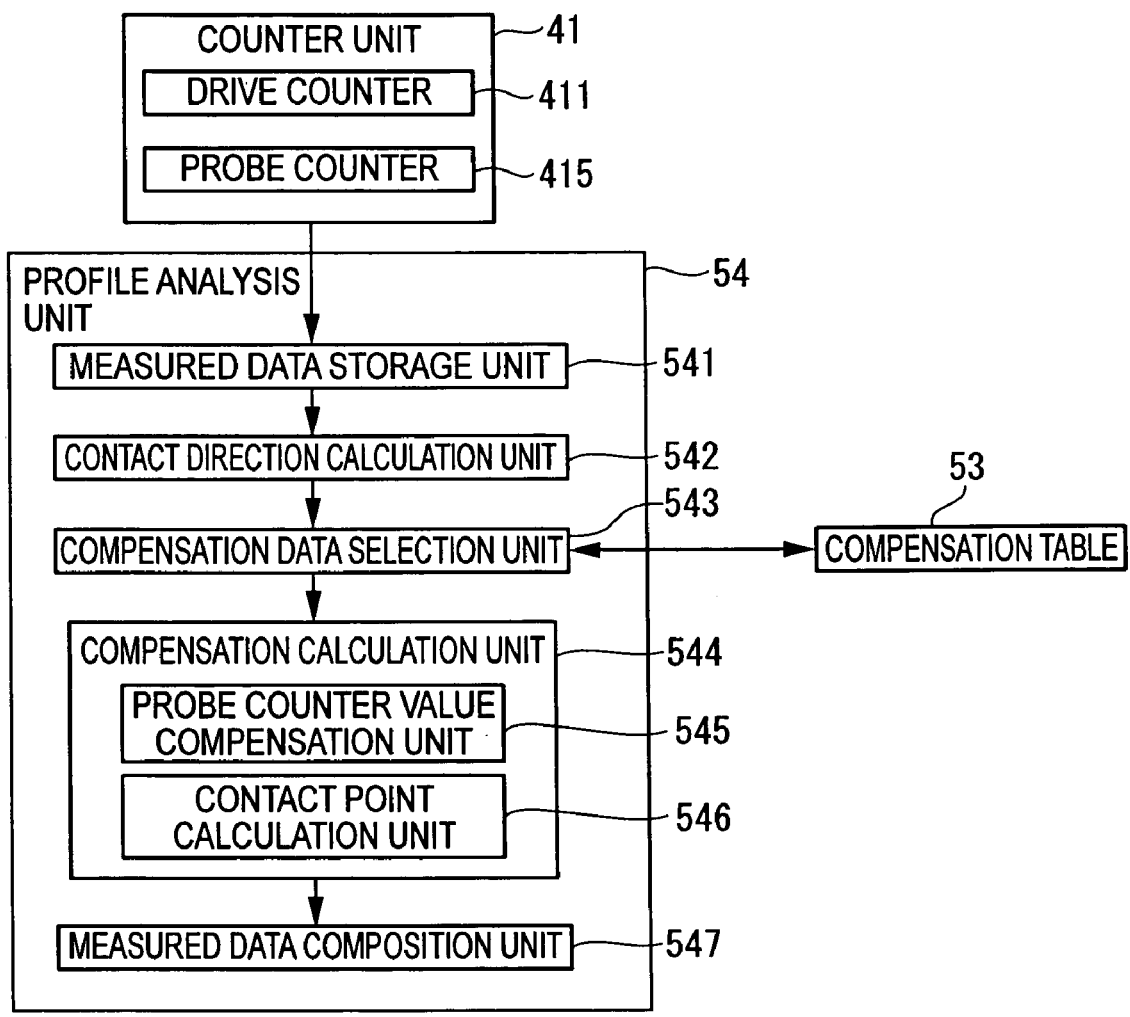
FIG. 3 shows a view indicative of the configuration of a profile analysis unit in the first embodiment.

As shown in FIG. 3, the profile analysis unit 54 has a measured data storage unit 541, a contact direction calculation unit (measurement direction calculation section) 542, a compensation data selection unit (compensation data selection section) 543, a compensation calculation unit 544, a measured data composition unit 547.

The measured data storage unit 541 transiently stores counter values counted by the counter unit 41. That is, when counter values by the drive counter 411 and counter values by the probe counter 415 are input, the measured data storage unit 541 transiently stores those values.

The contact direction calculation unit 542 calculates the contact direction (measurement direction) along which the scanning probe 2 comes into contact with the workpiece W. Since the counter values (Xp, Yp, Zp) by the probe counter 415 indicate a direction along which the contact portion 22 is pressed by the workpiece W or the normal line direction of the workpiece surface, the contact direction calculation unit 542 calculates the opposite direction of the direction indicated by the probe counter value as the contact direction along which the contact portion 22 presses the workpiece W. As one example, using the counter values (Xp, Yp, Zp) by the probe counter 415, a unit vector (contact direction unit vector) of the pressing directions (−Xp, −Yp, −Zp) are calculated. The calculation of the contact direction is performed for all the probe counter values sampled by the probe counter 415.

The compensation data selection unit 543 selects compensation data set up in the compensation table 53 based on the contact direction (contact direction unit vector) calculated by the contact direction calculation unit 542. For example, a direction that agrees with the contact direction calculated by the contact direction calculation unit 542 is selected from the directions (P1 to P29) set up in the compensation table 53. In case there is not a direction that agrees with the contact direction calculated by the contact direction calculation unit 542 in the compensation table 53, a direction that is most close to the contact direction calculated by the contact direction calculation unit 542 is selected from the directions (P1 to P29) set up in the compensation table 53. In selecting a direction that is most close to the contact direction, for example, inner product of the contact direction unit vector calculated by the contact direction calculation unit 542 and unit vectors of directions set up in the compensation table 53 are calculated, and a unit vector that makes the inner product largest is selected.

When contact directions are calculated for respective sampling points by the contact direction calculation unit 542, the compensation data selection unit 543 selects and reads out compensation data set up in the compensation table 53 for the respective sampling points.

The compensation calculation unit 544 corrects the counter values of the probe counter 415 using compensation data of the compensation table 53. The compensation calculation unit 544 has a probe counter value compensation unit (detection sensor value compensation unit) 545 and a contact point calculation unit (measurement point calculation unit) 546.

The probe counter value compensation unit 545 multiplies the probe counter values (Xp, Yp, Zp) for the respective axes by the compensation coefficients (Kxp, Kyp, Kzp) of compensation data selected by the compensation data selection unit 543 to correct the probe counter values. That is, corrected counter values (Xd, Yd, Zd) are indicated as follows.

$$Xd = Kxp \cdot Xp$$

$$Yd = Kyp \cdot Yp$$

$$Zd = Kzp \cdot Zp$$

Since thus corrected probe counter values (Xd, Yd, Zd) indicate displacements of the stylus 21 and correspond to displacements of the center of the contact portion 22, coordinate values of the center of the contact portion 22 are obtained.

The contact point calculation unit 546 corrects the probe counter values to be the contact point of the workpiece surface using compensation radiuses "r" of compensation data selected by the compensation data selection unit 543. The contact point calculation unit 546 shifts the (apparent) central coordinate values of the contact portion 22 by compensation radius "r" along the contact direction of the contact portion 22 and the workpiece W. As the contact direction of the contact portion 22 and the workpiece W, the contact direction unit vector calculated by the contact direction calculation unit 542 may be used.

Since coordinate values of the workpiece surface to be obtained is located at a position offset from the (apparent) center of the contact portion 22 by radius "r" of the contact portion 22, when the central coordinate values of the contact portion 22 is shifted along a predetermined direction using the compensation radius "r" (offset value Q) of the compensation table 53, contact point coordinate values of the contact point between the contact portion 22 and the workpiece surface are obtained.

The measured data composition unit 547 composites thus obtained contact point coordinate values and drive amount of the drive mechanism 12 counted by the drive counter 411 to obtain three-dimensional profile of the workpiece W.

The drive amount of the drive mechanism 12 is detected by the drive sensor 13 under the machine coordinate system, while displacement of the stylus 21 is detected by the probe sensor 24 under the probe coordinate system. Output values of the probe sensor 24 are corrected to the contact point between the contact portion 22 and the workpiece W using compensation data of the compensation table 53. When the contact point coordinate values and the drive amount of the drive mechanism 12 are composited, the workpiece surface profile is calculated. In compositing the contact point coordinate values and the drive amount of the drive mechanism 12, for example, the contact point coordinate values represented under the probe coordinate system are converted to those represented under the machine coordinate system, and thus converted contact point coordinate values are added to the drive amount of the drive mechanism 12.

The host computer 5 configures an analysis section, more specifically, the compensation table 53 and the profile analysis unit 54 configure the analysis section.

Thus configured first embodiment will be explained.

Firstly, prior to measurement, measurement conditions are set up and input. As the measurement conditions, the sampling pitch 511, reference displacement amount 512 and contour data 513 of a workpiece are set up.

Next, scanning direction commands input by an operator using the joystick 31 or scanning vector commands generated by the scanning vector command unit 52 based on the contour data 513 are output to the drive control circuit 42. Then, the drive control circuit 42 outputs control signals to the drive mechanism 12 to drive the drive mechanism 12. In the state of being pressed to the workpiece surface by the drive mechanism 12 by the reference displacement amount Δr, the scanning probe 2 is made to move and scan along the workpiece surface. At the time of scanning operation, based on the probe counter values output from the probe counter 415 to the scanning vector command unit 52, the displacement amount is controlled to be the reference displacement amount Δr.

When the scanning probe 2 scans the workpiece surface, the drive amount of the drive mechanism 12 is detected by the drive sensor 13, and displacement of the stylus 21 is detected by the probe sensor 24. Sensor outputs of the drive sensor 13 are counted by the drive counter 411, while sensor outputs of the probe sensor 24 are counted by the probe counter 415. The set up sampling pitch 511 obtains data counted by the counter unit 41.

Counter values counted and obtained by the counter unit 41 (drive counter 411 and probe counter 415) are output to the measured data storage unit 541 to be stored therein, and thus stored counter values are analyzed by the profile analysis unit 54 to obtain the surface profile of the workpiece.

Of the data stored in the measured data storage unit 541, displacement (probe counter values) of the scanning probe 2 is output to the contact direction calculation unit 542. The contact direction calculation unit 542 calculates the contact direction unit vector using the displacement (Xp, Yp, Zp) of the scanning probe 2, and a direction along which the contact portion 22 comes into contact with the workpiece W is calculated.

When the contact direction unit vector is calculated for all the obtained probe counter values, the compensation data selection unit 543 selects compensation coefficients to correct the probe counter values from the compensation table 53 based on thus obtained contact direction unit vectors.

At this time, inner product of the contact direction unit vector and unit vectors of directions (P1 to P29) set up in the compensation table 53 are obtained, and a unit vector that makes the absolute value of the inner product largest is selected. Then, compensation coefficients (Kxp, Kyp, Kzp) corresponding to the direction (P1 to P29) are read out.

Thus read out compensation coefficients (Kxp, Kyp, Kzp) are output to the probe counter value compensation unit 545, and corresponding probe counter values (Xp, Yp, Zp) are multiplied by the compensation coefficients. Then, the probe counter values are corrected, and the displacement amount of the scanning probe 2 toward the workpiece W is accurately obtained using thus corrected probe counter values (Xd, Yd, Zd). Consequently, the (apparent) central coordinate values of the contact portion 22 are obtained.

Furthermore, based on the contact direction unit vector, the compensation data selection unit 543 selects the compensation radius "r" to correct the (apparent) central coordinate values of the contact portion 22 to be contact point coordinate values of the contact point between the contact portion 22 and the workpiece W for respective counter values.

Thus selected compensation radius "r" is output to the contact point calculation unit 546, and is added to (or subtracted from) the central coordinate values of the contact portion 22.

The (apparent) central coordinate values of the contact portion 22 are obtained based on the probe counter values (Xd, Yd, Zd) corrected by the probe counter value compensation unit 545. Then, the compensation radius "r" is added to the (apparent) central coordinate values of the contact portion 22 along the direction of the contact direction unit vector. As a result, coordinate values of the contact point between the contact portion 22 and the workpiece surface are calculated. Thus calculated coordinate values of the contact point are output to the measured data composition unit 547.

Thus calculated coordinate values of the contact point and the drive amount of the drive mechanism 12 counted by the drive counter 411 are composited by the measured data composition unit 547. Accordingly, the profile of the workpiece surface is obtained.

According to thus configured first embodiment, following effects can be realized.

(1) Since compensation coefficients (Kxp, Kyp, Kzp) are set up in the compensation table 53 for respective contact directions as compensation data, even if detection error is caused in the probe sensor 24 depending on the direction along which the contact portion 22 comes into contact with the workpiece W, sensor output can be corrected depending on the contact direction. As a result, the displacement amount is accurately detected, and the central coordinate values of the contact portion 22 are accurately obtained.

Furthermore, since compensation radiuses "r" are set up in the compensation table 53 for respective contact directions as compensation data, the contact point between the contact portion 22 and the workpiece surface is accurately obtained by adding (or subtracting) the compensation radius "r" to (or from) the (apparent) central coordinate values of the contact portion 22. At this time, since the compensation radiuses "r" are set up for the respective contact directions, the surface profile of the workpiece W can be accurately measured irrespective of profile errors (error from a perfect sphere etc.) of the contact portion 22 or flexure of the stylus 21.

(2) Measured data obtained by the counter unit 41 during scanning operation is transiently stored in the measured data storage unit 541, and is arithmetically processed by the profile analysis unit 54 after scanning operation is completed and all the measured data is obtained. Accordingly, since arithmetic processing to obtain profile is not performed during scanning operation, the scanning operation can be promptly performed.

(3) In some cases, detection errors are generated in the probe sensor 24 due to the flexure of the stylus 21 and the like, depending on the contact direction and the reference displacement amount Δr cannot be kept fixed, which can be corrected using the compensation radius "r" including errors of the reference displacement amount along the contact direction. As a result, the surface profile of the workpiece W can be accurately obtained irrespective of the flexure of the stylus 21 along the contact direction.

(4) Since probe counter values are corrected using compensation coefficients depending on the contact direction, the contact direction between the contact portion 22 and the workpiece surface is accurately obtained. As a result, coordinate values of the workpiece surface can be accurately obtained by shifting the central coordinate values of the contact portion 22 along a proper direction by the compensation radius "r".

Second Embodiment

A second embodiment of the method of forming a compensation table of a scanning probe according to the present invention will be explained. FIG. 4 shows a flow chart of the method of forming a compensation table.

Incidentally, in the second embodiment, a measuring system same to that described in the first embodiment can be used.

In ST1, a master ball 7 is prepared. The master ball 7 is a perfect sphere with a predetermined radius, and is arranged on, for example, the measuring base 11, as shown in FIG. 17.

In ST2, central coordinate value and radius of the master ball 7 are determined. In determining central coordinate value and radius of the master ball 7, for example, the master ball 7 may be measured at multiple points thereon using another scanning probe that has been calibrated in advance to determine the center and radius. Alternatively, the master ball 7 may be measured at multiple points thereon using a touch signal probe or a detector utilizing the Doppler effect of a laser to determine the center and radius. Thus obtained central coordinate value and radius of the master ball 7 are stored in the host computer 5. Since the master ball 7 is a perfect sphere with a predetermined radius, the radius also can be obtained from its design data.

In ST3, grid points (compensation points) P1 to P29 are set up on the spherical surface of the master ball 7 (compensation point setting up step). Using the central coordinate values and radius of the master ball 7 determined in ST2, grid points P1 to P29 are set up and periodically arranged on the spherical surface of the master ball 7.

The contact direction is set up for each of the grid points P1 to P29 which comes from the grid point and goes to the center of the master ball 7. When the contact portion 22 comes into contact with the workpiece W, probe sensor outputs (or probe counter outputs) and offset values (for example, compensation radiuses "r") from the center of the contact portion 22 to the workpiece surface are corrected along the contact direction.

FIG. 5 shows an example of the grid points (P1 to P29) set up on the spherical surface of the master ball 7. In FIG. 5, X-axis, Y-axis and Z-axis, which are perpendicular to each other, are set up with the center of the master ball 7 set to be the origin. Then, a plane (X-Y plane) that includes the origin and is perpendicular to the Z-axis is set to be the equatorial plane, and the grid points are set up on a hemisphere of the master ball 7 which corresponds to the positive side of the Z-axis from the equatorial plane. In FIG. 5, 29 points are prepared for the grid points, and the grid points (P1 to P29) are set up on several predetermined positions on intersections formed by longitude lines that divide the equator into sixteen segments and latitude lines that divide the surface of the hemisphere or from the equator to the pole (intersection of the Z-axis and the master ball 7) into four segments.

Figure 6:
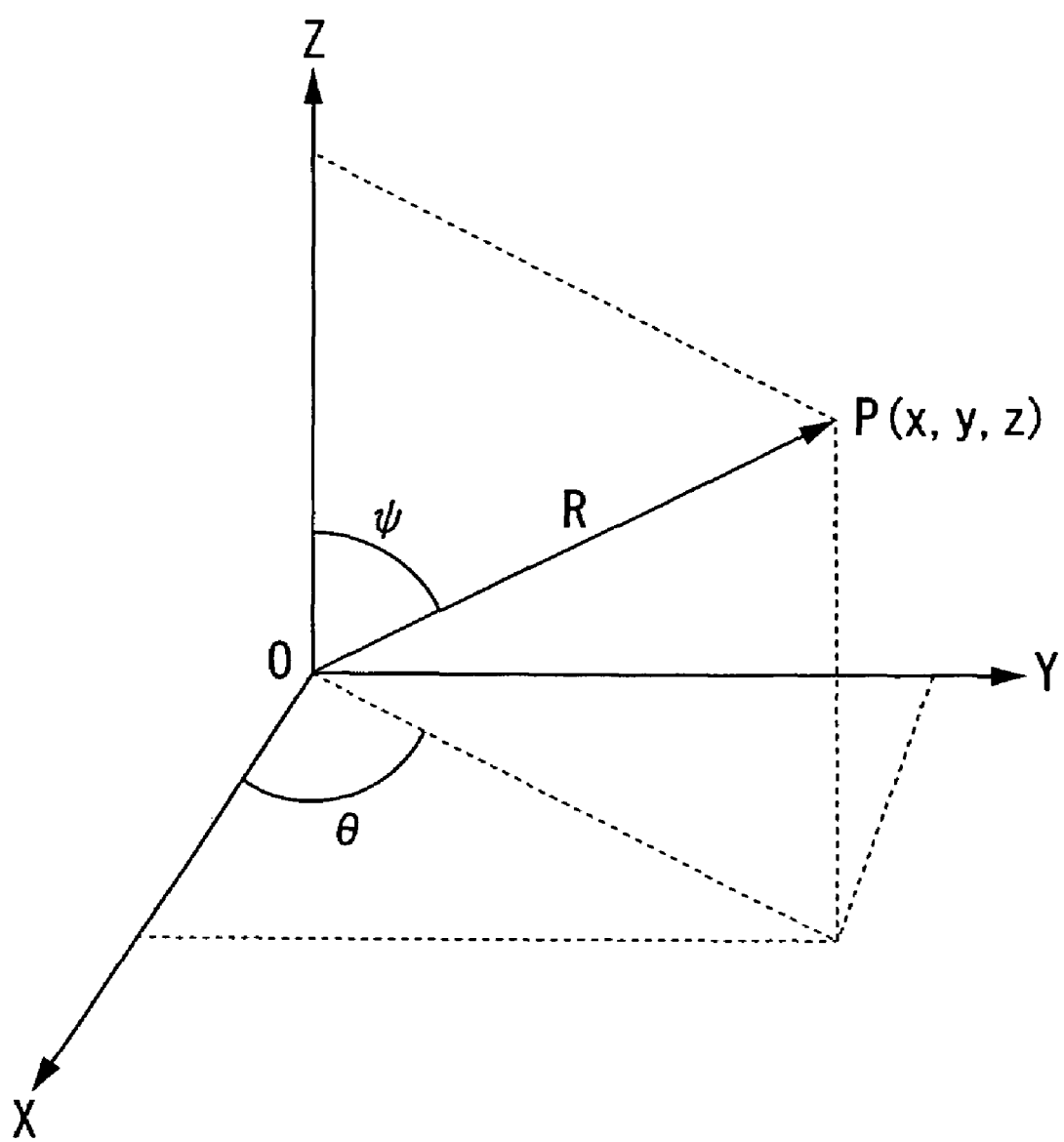
FIG. 6 shows an example of obtaining coordinate values of the grid point in the second embodiment.

As shown in FIG. 6, using angular parameters θ, ψ, and radius R of the master ball 7, coordinate values P (x, y, z) of the respective grid points are indicated as follows with the center of the master ball 7 set to be the origin.

$x = R \cdot \sin \Psi \cos \theta$ $y = R \cdot \sin \Psi \sin \theta$ $z = R \cdot \cos \Psi$ In ST4, the scanning probe 2 is moved along a direction coming from the grid point and going to the center of the master ball 7 to make the contact portion 22 come into contact with the respective grid points P1 to P29 (compensation point detection step). Then, the contact portion 22 is pressed to the master ball 7 by the reference displacement amount Δr.

At this time, the scanning probe 2 is moved by the drive mechanism 12 of the coordinate measuring machine 1. Thus, after the contact portion 22 abuts on the master ball 7, in the process in which the contact portion 22 is pressed to the master ball 7, output values of the drive sensor 13 correspond to output values of the probe sensor 24.

So, based on output values of the drive sensor 13, the contact portion 22 is pressed to the respective grid points by the reference displacement amount.

It can be judged from detection signals from the probe sensor 24 that the contact portion 22 abuts on the master ball 7.

In ST5, compensation coefficients (Kxp, Kyp, Kzp) to correct output values of the probe sensor 24 (or output values of the probe counter 415) and compensation radius "r" from the center of the contact portion 22 to the grid point of the master ball 7 are calculated (compensation data calculation step).

In the state in which the scanning probe 2 is pressed to the grid point by the reference displacement amount Δr, output values of the probe sensor 24 (or output values of the probe counter) are detected. Then, compensation coefficients (Kxp, Kyp, Kzp) to correct deviation between output values (Xp, Yp, Zp) of the probe sensor 24 and output values of the drive sensor 13 are obtained for the respective axes.

Furthermore, central coordinate values of the contact portion 22 are compared with coordinate values of the grid point to calculate offset value (compensation radius "r") from the apparent center of the contact portion 22 to the grid point.

In ST6, it is judged whether or not compensation coefficients and compensation radius are calculated for all the set up grid points, and in case it is judged that compensation coefficients and compensation radius are calculated for all the set up grid points, in ST7, thus calculated compensation coefficients and compensation radiuses are stored in the compensation table 53.

In ST7, the compensation coefficients and compensation radiuses are stored for the respective contact directions (P1 to P29), and the compensation table 53 shown in FIG. 2 is formed (compensation table forming step).

On the other hand, in ST6, in the case it is judged that compensation coefficients and compensation radiuses are not calculated for all the set up grid points, returning to ST4, compensation coefficients and compensation radiuses are calculated for the respective grid points.

When correcting output values of the probe sensor 24 and compensation radiuses using thus formed compensation table 53, absolute value of inner product of the contact direction unit vector calculated by the contact direction calculation unit 542 and unit vectors of directions set up in the compensation table 53 are calculated, and a unit vector that makes the absolute value of inner product largest is selected from the compensation table 53.

In the compensation table 53, contact directions corresponding to hemisphere of the master ball 7 (corresponding to the positive side of the Z-axis) alone are set up. In case the contact portion 22 moves from the positive side of the Z-axis to the negative side of the Z-axis and abuts on the workpiece (for example, arrow A shown in FIG. 5), substantially corresponding direction is set up in the compensation table 53. Accordingly, inner product of the contact direction unit vector calculated by the contact direction calculation unit 542 and unit vectors of contact directions (P1 to P29) set up in the compensation table 53 are calculated, and a unit vector that makes the inner product largest is selected from the compensation table 53.

On the other hand, in case the contact portion 22 moves from the negative side of the Z-axis to the positive side of the Z-axis and abuts on the workpiece W (for example, arrow B shown in FIG. 5), contact directions are opposite to those set up in the compensation table 53. In this case, a contact direction which is substantially parallel with an actual direction and whose direction is opposite can be selected from the compensation table 53 by calculating the absolute value of inner product.

Even though thus selected contact direction (from P1 to P29) set up in the compensation table 53 is opposite to the actual contact direction, since the cause leading to measurement errors such as the flexure of the stylus 21 and offset value (compensation radius) is alike, output values of the probe sensor 24 can be corrected to coordinate values of the workpiece surface using equivalent compensation data of opposite direction.

According to thus configured second embodiment, following effects can be realized.

(5) Since grid points are evenly set up on a sphere such as the master ball 7 and compensation data is obtained for the respective grid points, compensation data can be obtained for all the necessary directions.

(6) Since the grid points are set up only on hemisphere of the master ball 7, compensation data can be reduced to half.

Third Embodiment

A third embodiment of the surface scan measuring device according to the present invention will be explained.

Figure 7:
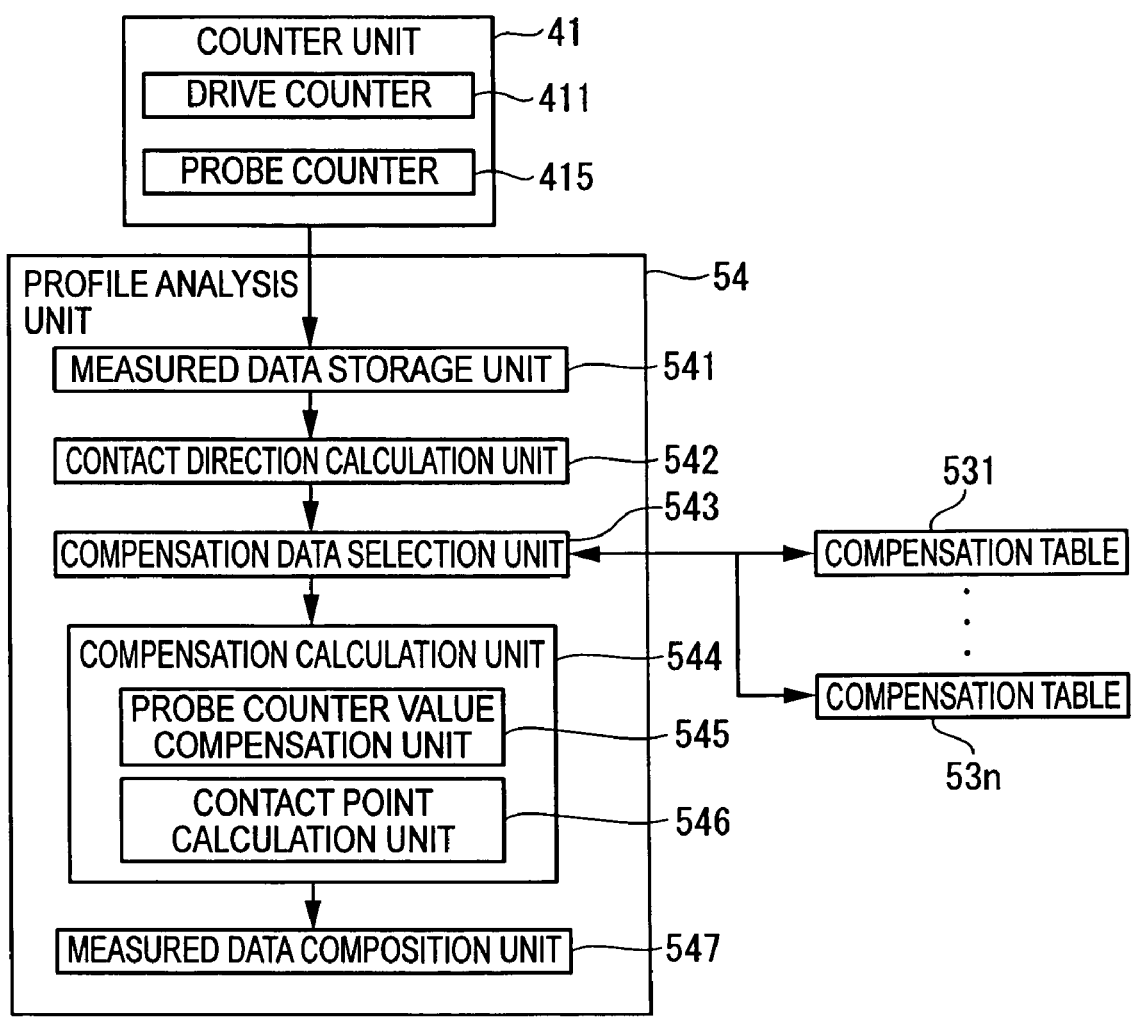
FIG. 7 shows a view indicative of the configuration of a profile analysis unit and compensation tables according to the present invention in the third embodiment.

Though the basic configuration of the third embodiment is similar to that of the first embodiment, and the configuration of compensation table is different, as shown in FIG. 7.

That is, a plurality of compensation tables 531, 532, . . . 53n are prepared, which correspond to a plurality of contact portions 22 and have compensation data stored therein.

For example, in the scanning probe 2, the stylus 21 may be composed of a linear axis unit and a cross-shaped arm perpendicular to the linear axis unit which has four arm members extending crisscross from the leading end of the linear axis unit, and the contact portion 22 is attached to the leading end of the respective arm members.

In this case, the compensation table is prepared for the respective contact portions (measuring pieces) 22, specifically, four compensation tables 531, 532, 533 and 534 are prepared.

The compensation data selection unit 543 selects compensation data based on the contact direction similar to the first embodiment using a compensation table corresponding to a contact portion (measuring piece) 22 used for scanning measurement.

The respective compensation tables are stored in detachable memory elements that are exchangeable.

Modification 1

Next, a modification 1 of the present invention will be explained.

Figure 8:
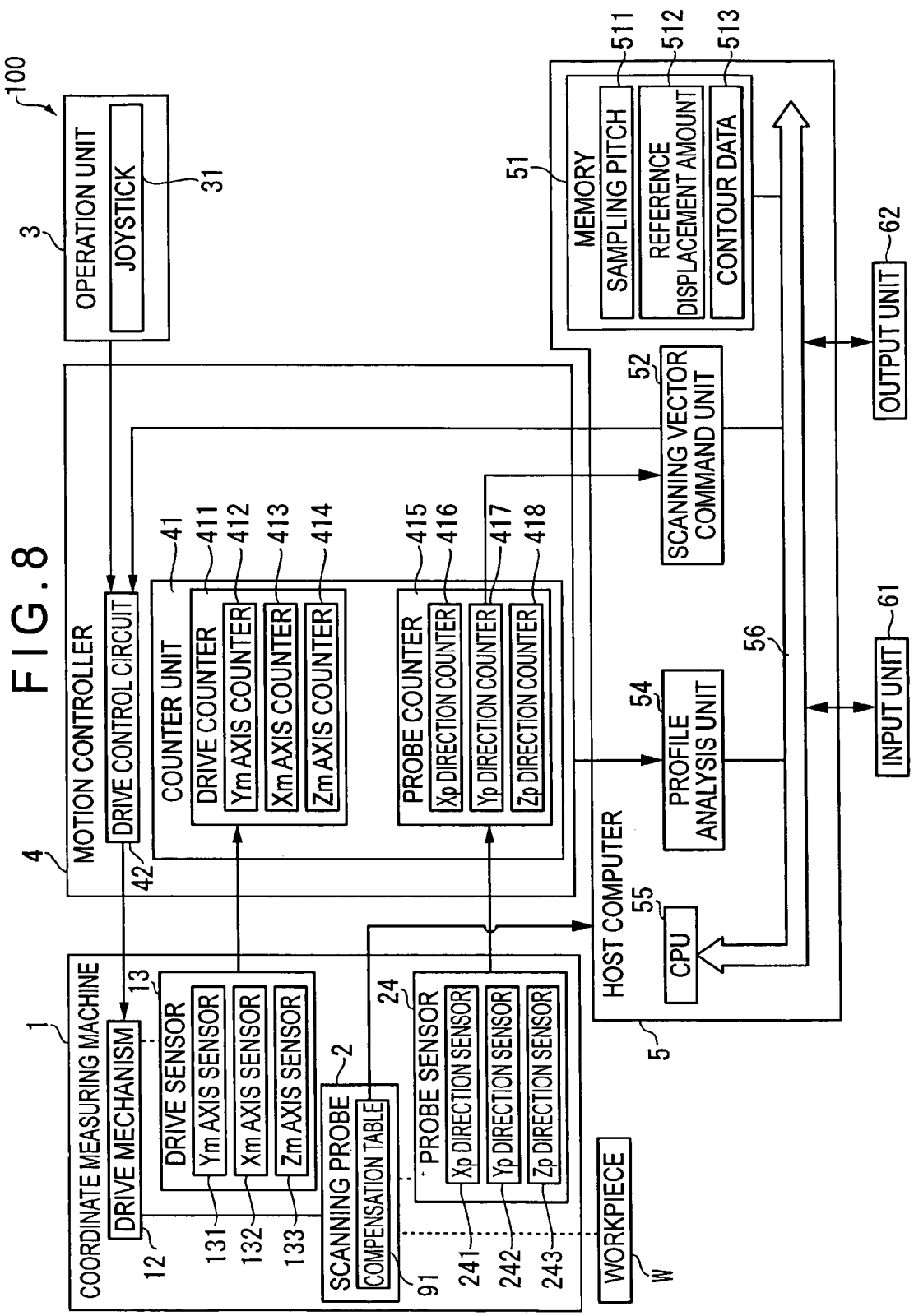
FIG. 8 shows a block diagram of the configuration of the surface scan measuring device according to the modification of the present invention.

The compensation table in the first embodiment and the third embodiment is arranged in the host computer 5, while a compensation table 91 in the modification 1 is arranged in the scanning probe 2, as shown in FIG. 8.

Accordingly, the profile analysis unit 54 reads out compensation data set up in the compensation table 91 arranged in the scanning probe 2. For the rest, the modification 1 is similar to the first embodiment or second embodiment.

The compensation table 91 may be stored in a nonvolatile storage device, or stored in a detachable memory element that is exchangeable.

Accordingly, since the compensation table 91 is arranged in the scanning probe 2, when the scanning probe 2 is changed, the compensation table 91 is also changed concurrently.

Under this configuration, most appropriate compensation data corresponding to the scanning probe 2 can be surely utilized. Furthermore, there is not raised confusion of compensation data, which facilitates the management of the compensation data.

Fourth Embodiment

A method of forming a compensation table for a scanning probe according to the fourth embodiment of the present invention will be described bellow:

Conventionally, when obtaining compensation coefficients, which correct detected values obtained by probe sensor (detection sensor) 24, and compensation radiuses "r" (i.e., offset values), the least square method have been used.

For example, the compensation coefficients and the compensation radiuses "r" of the contact portion 22 can be obtained by measuring the surface of a master ball 7, which is a perfect sphere with a given radius, at a plurality of points thereon, and making the square sum of the measurement errors of the measured values least.

Figure 9:
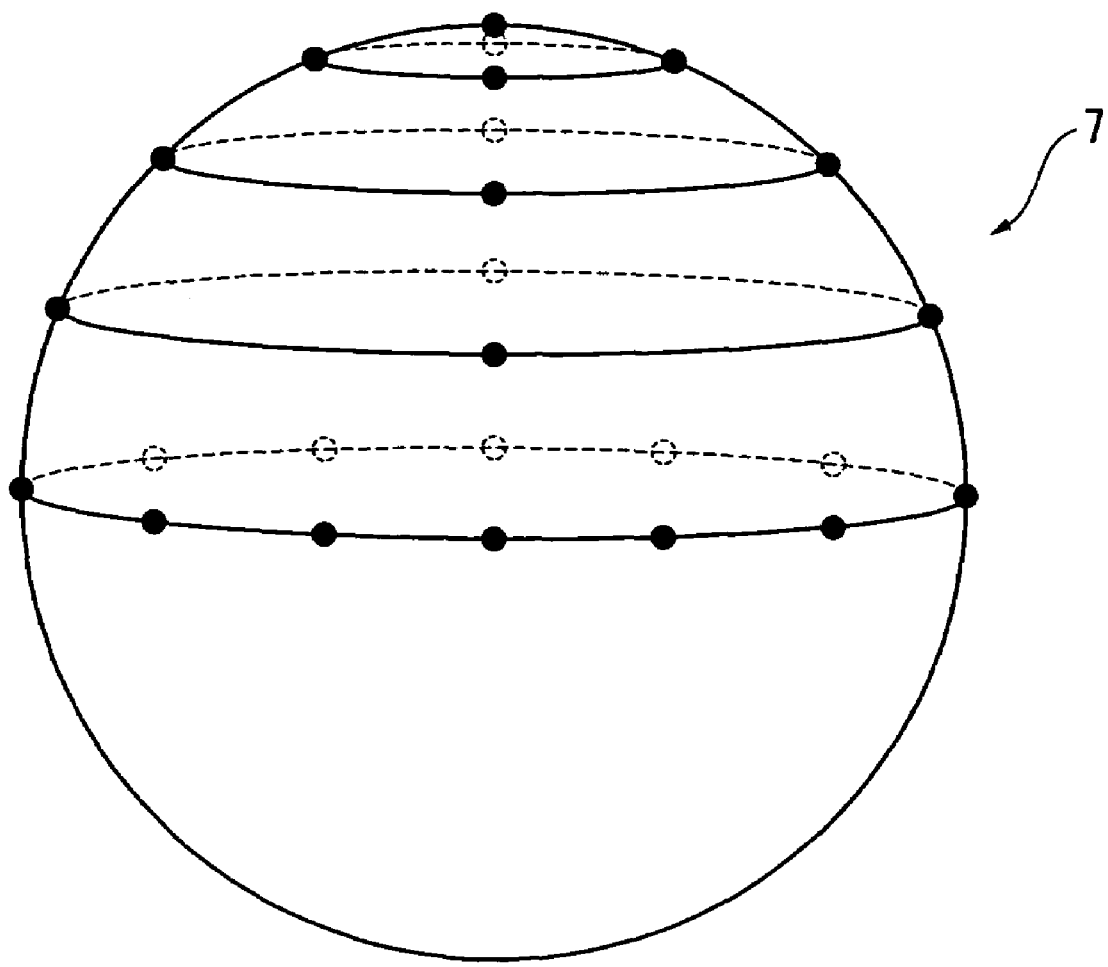
FIG. 9 is an illustration showing how compensation points are set in conventional way in the fourth embodiment, which discloses a method of forming a compensation table for a scanning probe.

At this time, the compensation points set on the master ball 7 are approximately evenly disposed on the hemisphere of the master ball 7 as shown in FIG. 9.

With the compensation table formed based on the compensation points approximately evenly disposed on the hemisphere of the master ball 7, the measured values can be corrected regardless of the measurement direction of the workpiece W.

However, since such compensation table is formed in order to minimize the errors entirely, the errors in any of measurement directions will remain.

Figure 10:
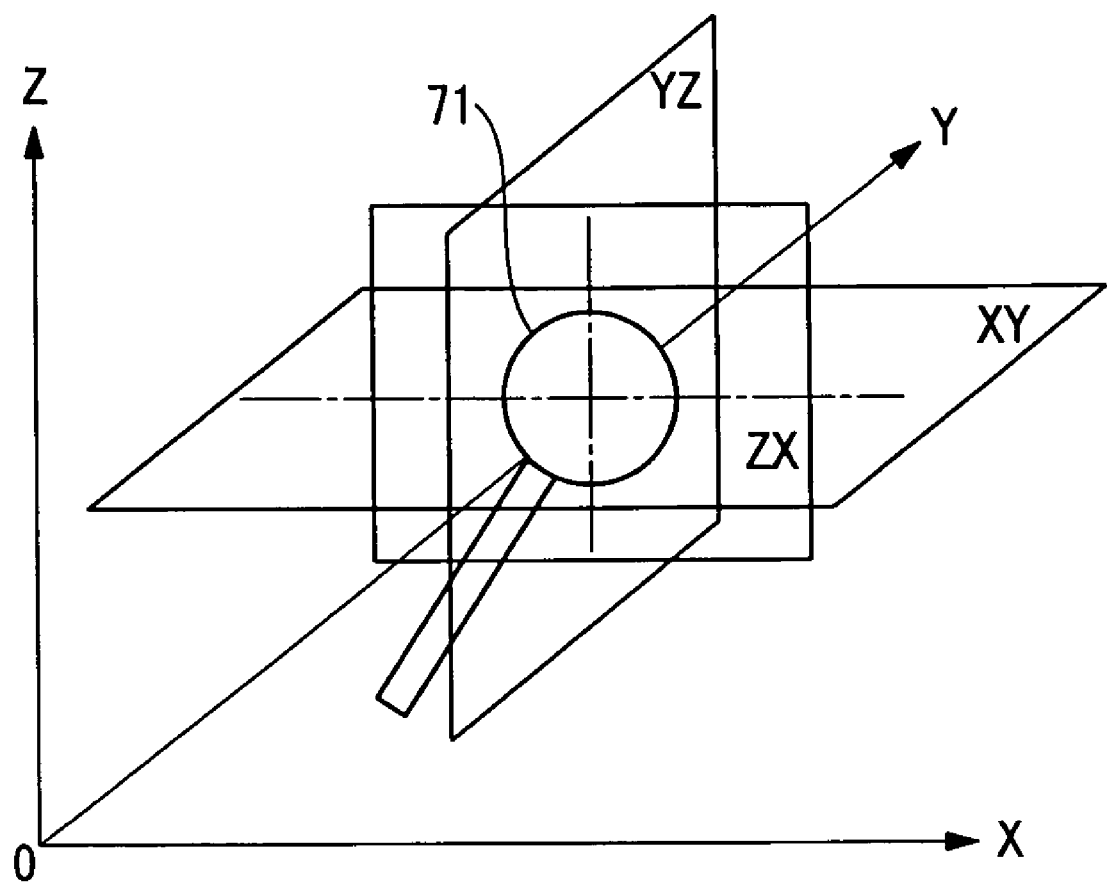
FIG. 10 is an illustration showing how a perfect sphere is measured on three cross-sections thereof in the fourth embodiment.
Figure 11A:
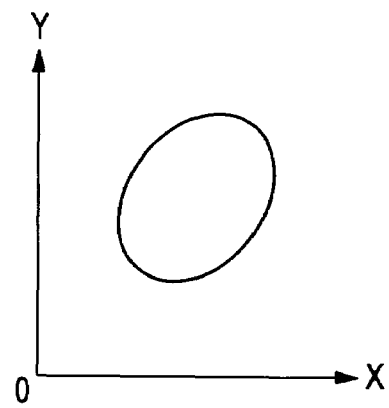
FIG. 11A, FIG. 11B and FIG. 11C are illustrations showing how measured values are corrected by using a conventional compensation table in the fourth embodiment.
Figure 11B:
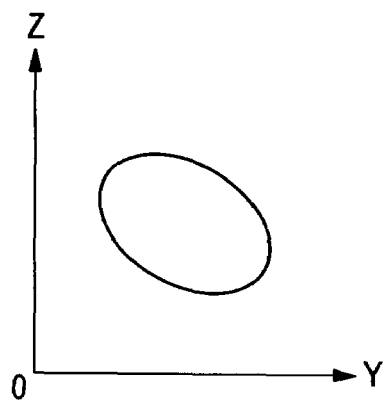
Figure 11C:
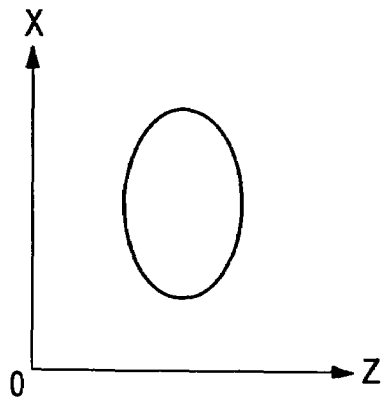

For example, when measuring the profile of the perfect sphere 71 on three cross-sections as shown in FIG. 10, the errors will remain on any of X-Y plane, Z-Y plane and Z-X plane as shown in FIG. 11.

Therefore, the profile of the workpiece W can not be measured with high accuracy with this method.

The fourth embodiment is to provide a method of forming a compensation table for a scanning probe for measuring the profile of a workpiece at high accuracy, and adopts the following constitution.

Figure 12:
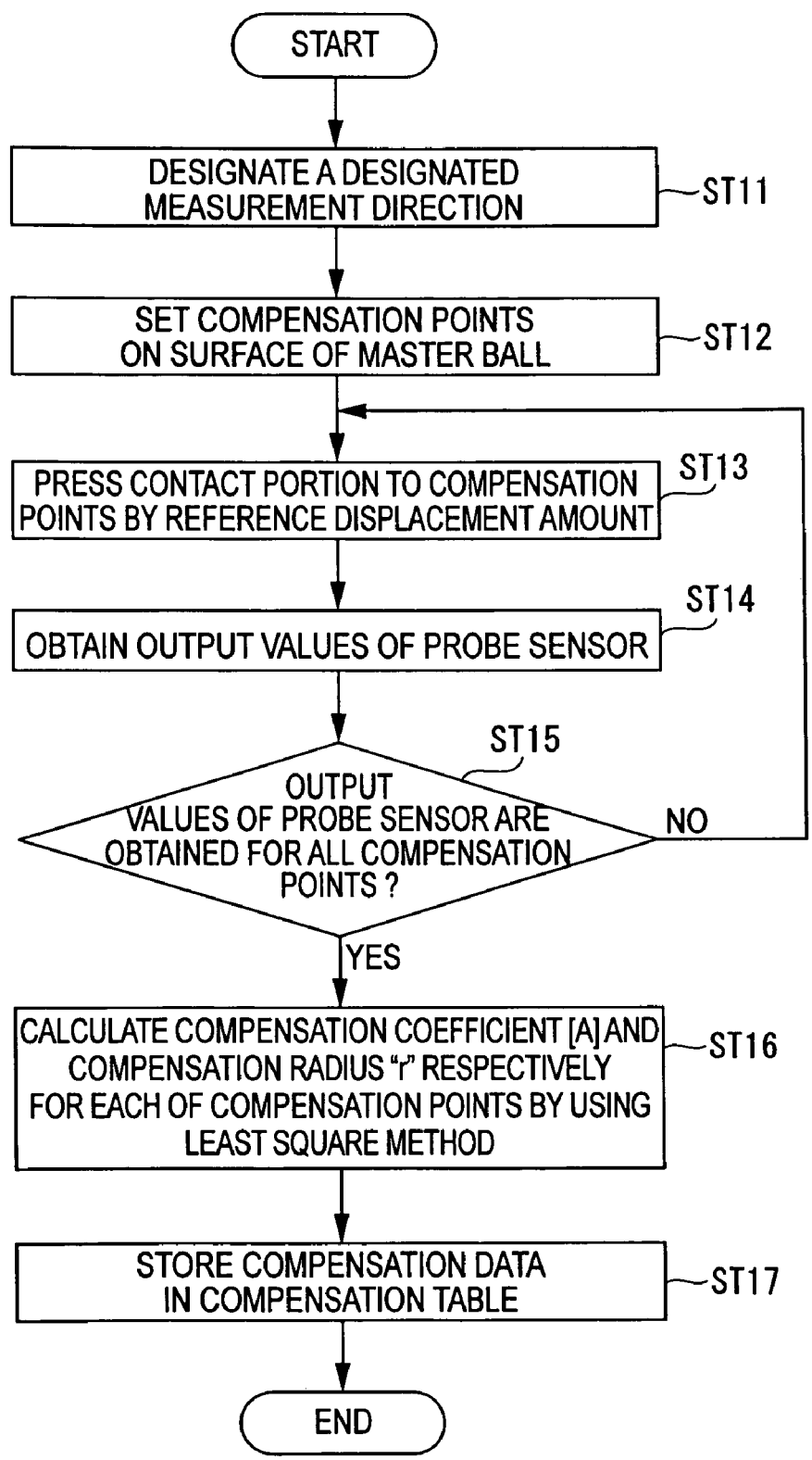
FIG. 12 is a flowchart showing the method of forming a compensation table for a scanning probe in the fourth embodiment.
Figure 13:
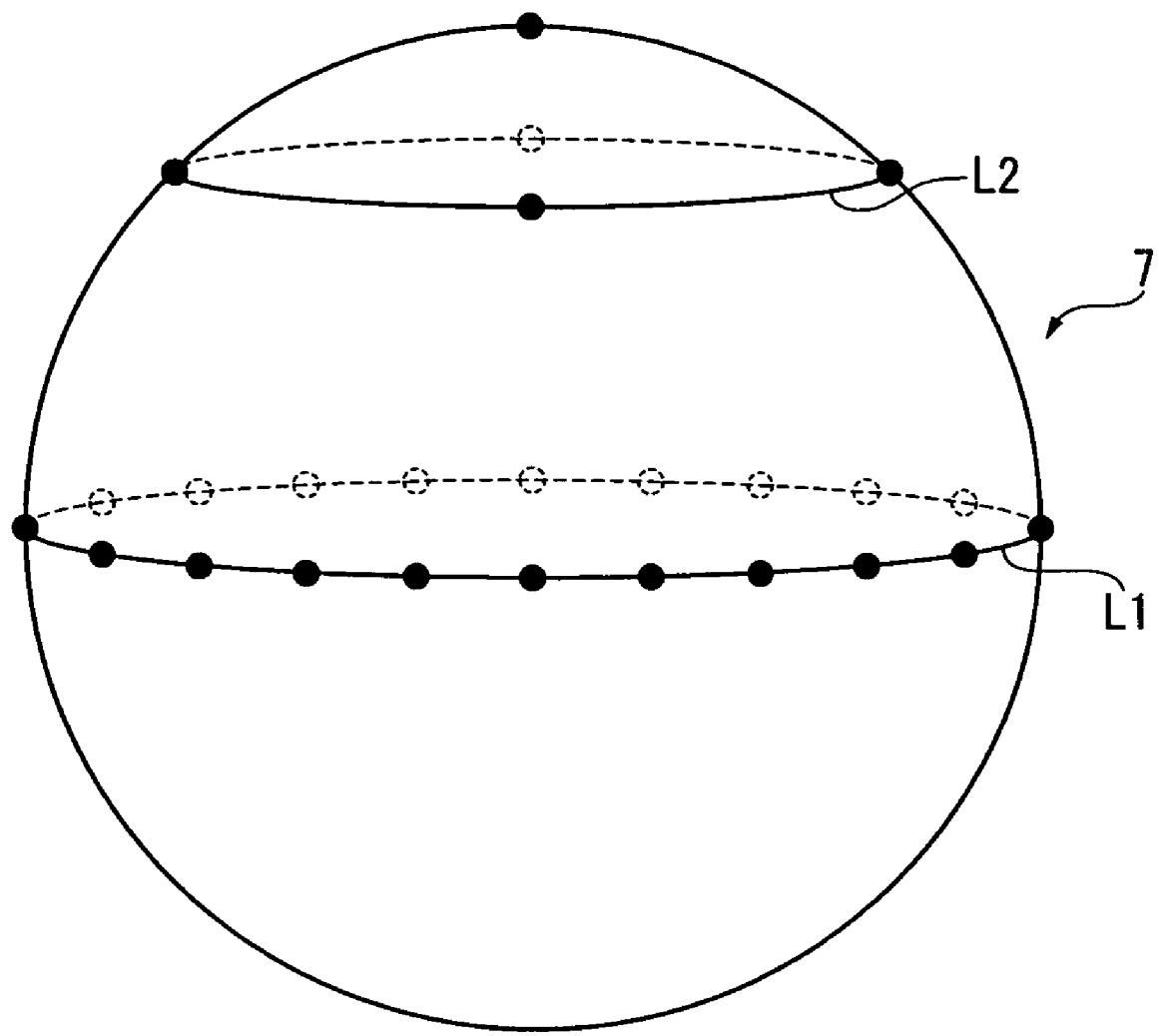
FIG. 13 is an illustration showing how compensation points are set on the master ball in the fourth embodiment.

The method of forming a compensation table for a scanning probe in the fourth embodiment will be explained with reference to the flowchart of FIG. 12.

Incidentally, the embodiment will be explained using an example in which the object to be measured is a cross-section of the workpiece W sectioned on the X-Y plane, and the measurement direction of workpiece W (designated measurement direction) is perpendicular to Z-axis.

In the fourth embodiment, a designated measurement direction is first designated (i.e., a designated measurement direction is set up) (ST11), and then in step ST12, a plurality of compensation points are set on the surface of the master ball (the reference gauge) (compensation points setting step). At this time, lots of compensation points are set on the line (the equator) intersected with the X-Y plane. In such an arrangement, the compensation points set on the equator $L_1$, on the line of latitude 45° $L_2$ and at pole respectively have predetermined pitches, namely, the sampling pitch is set short on the equator $L_1$ but long on the line of latitude 45° $L_2$.

Next, in the step ST13, the contact portion 22 of the scanning probe 2 is brought into contact with compensation point and presses the master ball 7 by reference displacement amount Δr (compensation point detection step). The output values of the probe sensor 24 are sequentially stored in a predetermined storage section (ST14).

After all compensation points are detected (ST15: YES), in the step ST16, the compensation coefficients for correcting the output values of the probe sensor 24 (or the output values of the probe counter 415) and the compensation radiuses "r", which are the distance from the center of the contact portion 22 to compensation points of the master ball 7, are calculated by using least square method (compensation data calculating step).

Figure 14:
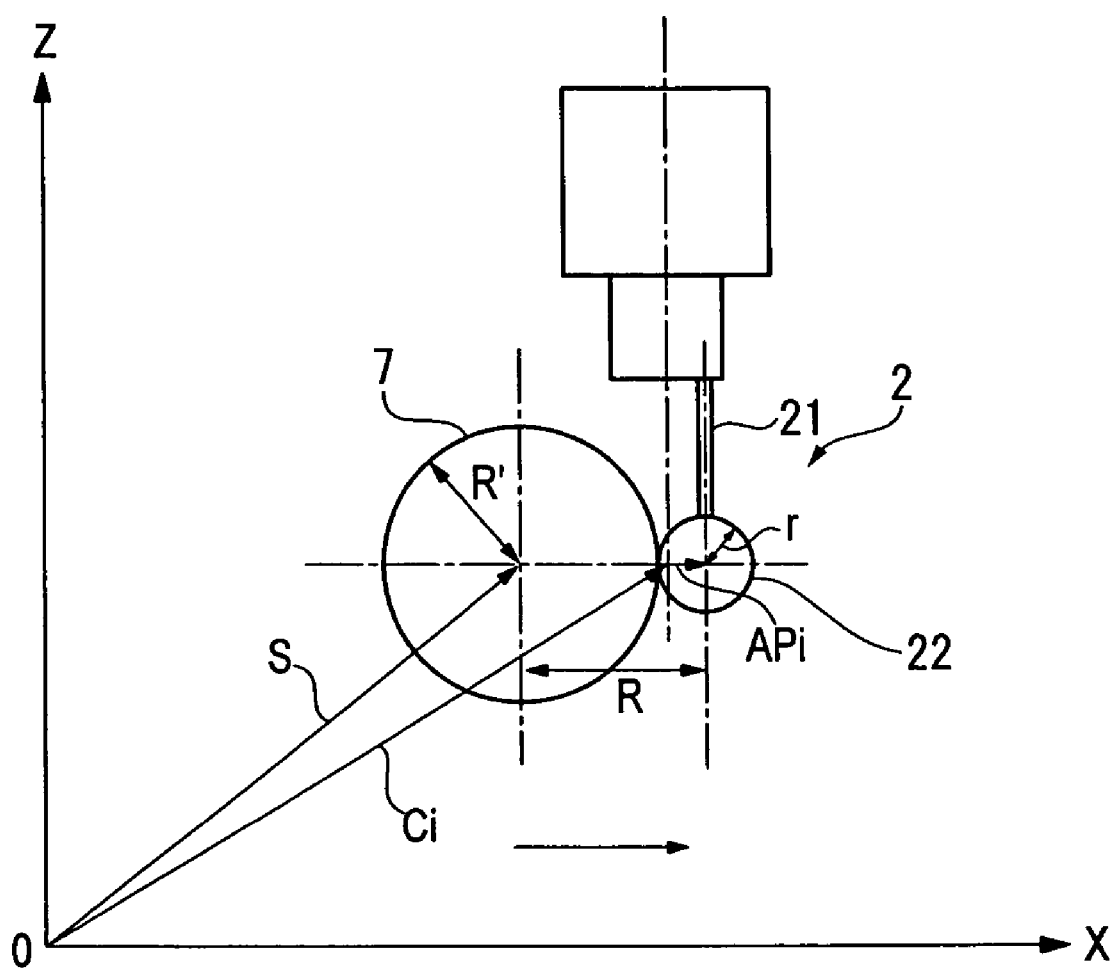
FIG. 14 is an illustration showing the relation of each parameter in the fourth embodiment.

The calculation of the compensation data (the compensation coefficients, the compensation radiuses) by using least square method will be explained with reference to FIG. 14.

The compensation coefficient to be obtained is represented by a matrix [A] of 3×3, the output value of probe sensor 24 is represented by $P_i$, and the output value of the drive sensor 13 is represented by $C_i$. Further, the central coordinate values of the master ball 7 is represented by S. If the radius of the master ball 7 is "R'" and the compensation radius to be obtained is "r", then the distance between the center of the contact portion 22 and the center of the master ball 7 R (R=R'+r) can be expressed by the following expression:

$$R = |C_i + A\, P_i - S|$$

Accordingly, the expression of the least square which makes measurement error smallest is expressed by the following expression:

$$fi = |C_i + AP_i - S| - R \qquad (1)$$

$$\sum_{i=1}^{n} fi^2 \to \min$$

In the step ST17, the obtained compensation coefficients [A] and the radiuses are stored in the compensation table (compensation table forming step).

By using such a compensation table, the output values of the probe sensor 24 and the compensation radiuses "r" are corrected.

Herein, the output values $P_i$ of the probe sensor are corrected by the compensation coefficient [A].

$$Q = [A]P = \begin{pmatrix} A_{11}, A_{12}, A_{13} \\ A_{21}, A_{22}, A_{23} \\ A_{31}, A_{32}, A_{33} \end{pmatrix} \begin{pmatrix} P_1 \\ P_2 \\ P_3 \end{pmatrix} = \begin{pmatrix} Q_1 \\ Q_2 \\ Q_3 \end{pmatrix}$$

Incidentally, when applying the least square of (Expression 1), since the number of the elements of the compensation coefficient [A] are nine, the number of the central coordinate values of the master ball 7 are three, and the number of the compensation radius is one, therefore the number of the compensation points set on the surface of the master ball 7 should be no less than 13.

According to the fourth embodiment, the following effects can be achieved.

Since the compensation table corresponding to the designated measurement direction for measuring the workpiece W can be formed, the measured value obtained in the designated direction can be accurately corrected by using the compensation table.

Figure 15A:
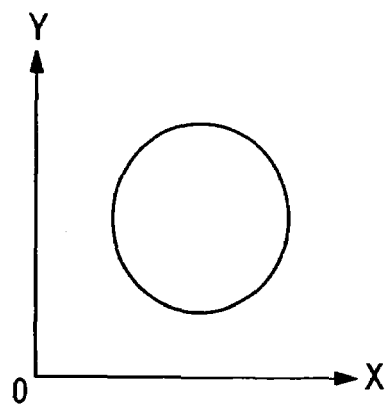
FIG. 15A, FIG. 15B and FIG. 15C are illustrations showing how measured values are corrected by using the compensation table in the fourth embodiment.

For example, in the case where the designated measurement direction is on X-Y plane (i.e., the designated measurement direction is perpendicular to Z-axis), if the measured values are corrected by using the compensation table corresponding to the designated measurement direction, as shown in FIG. 15A, the profile of the perfect sphere 71 can be accurately measured.

Figure 15B:
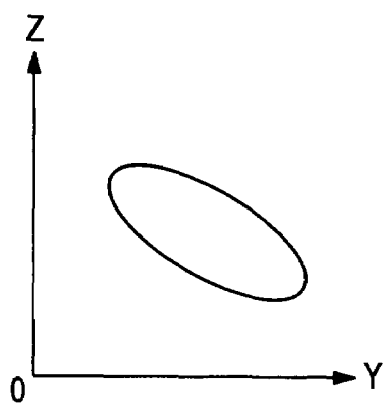
Figure 15C:
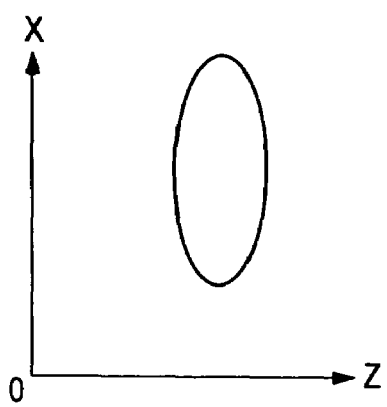

Herein, as shown in FIG. 15B and FIG. 15C, though when applying the above compensation table to the measurement on the Y-Z plane and Z-X plane, the error becomes large, it will not be a problem because the measurement direction of the workpiece W is on X-Y plane, and the compensation accuracy on other directions does not make problem.

Incidentally, a plurality of compensation tables can respectively be formed for each different designated measurement direction.

Further, when selecting compensation table for correcting the measured values of the workpiece, the compensation table can be designated by external setting input, or the selection can be done automatically.

For example, in addition to the compensation table for the case where the designated measurement direction is on the X-Y plane (i.e., the designated measurement direction is perpendicular to the Z-axis), the compensation table for the case where the designated measurement direction is on the Y-Z plane (i.e., the designated measurement direction is perpendicular to the X-axis) and the compensation table for the case where the designated measurement direction is on the Z-X plane (i.e., the designated measurement direction is perpendicular to the Y-axis) can be formed respectively.

If the measured values are corrected by the compensation table selected in corresponding to the direction in which the workpiece W is measured, then the profile of the workpiece can be accurately measured not only on X-Y plane (as shown in FIG. 15A), but also on Y-Z plane (as shown in FIG. 15B) and on Z-X plane (as shown in FIG. 15C).

As the designated measurement direction, not only the direction in which the scanning probe 2 approaches the workpiece W, but also the angle of the stylus 21, at which scanning probe touches the workpiece, can be included in the information of the designated measurement direction. When the contact portion 22 touches the workpiece W, if the angle of the stylus 21 varies, the torsional rigidity of the stylus 21 will vary correspondingly, therefore the detection error of the probe sensor 24 and the compensation radius will also vary. Accordingly, if the compensation table corresponding to the angle of the stylus 21 is formed, then the compensation can be carried out more accurately.

Though the present embodiment is explained using the example in which the designated measurement direction of the workpiece W is on the X-Y plane (i.e., the designated measurement direction is perpendicular to Z-axis), the designated measurement direction is not limited thereto.

Figure 16:
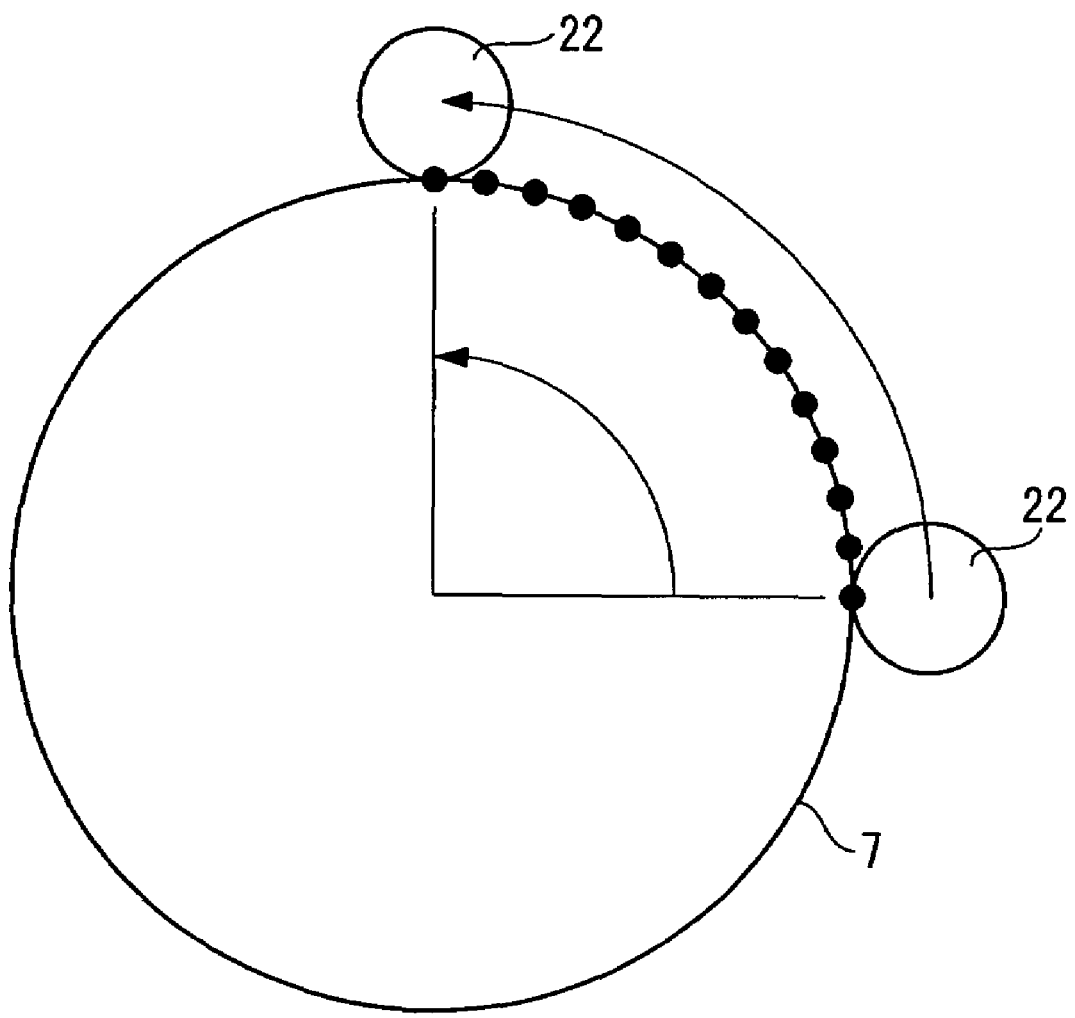
FIG. 16 is an illustration showing how compensation points are set on the master ball in the fourth embodiment.

For example, in addition to the condition that designated measurement direction of the workpiece W is on the X-Y plane (i.e., the designated measurement direction is perpendicular to Z-axis), the designated measurement direction can be further limited to, for example, a range from −45° to +45° on the X-Y plane as shown in FIG. 16. Incidentally, even in such a case, due to the number of the unknown in the least squire method, the number of the compensation points should be no less than 13.

Further, in the case where the workpiece W has a shape of gear, blade, scroll (screw-shaped) or the like, by preliminarily selecting the designated measurement directions for measuring such specifically shaped workpiece, and setting (lots of) compensation points on the master ball at the points corresponding to the selected designated measurement directions, the compensation table suitable for correcting the measured values obtained by the measurement of the specifically shaped workpiece can be formed.

Further, in addition to the compensation tables for the designated measurement directions, the compensation tables for each scanning speed can also be formed.

While the invention has been described in accordance with certain preferred embodiments, it should be understood by those ordinarily skilled in the art that the invention is not limited to the above embodiments, but various modifications, alternative constructions or equivalents can be implemented without departing from the scope and spirit of the present invention.

Compensation coefficients alone may be set up in the compensation table 53. In this case, scanning operation is controlled so that the displacement amount is accurately fixed during scanning operation. In case the contact portion 22 is a perfect sphere and the offset value is considered to be a constant value, the offset value is not required to be corrected depending on the contact direction.

In the compensation data selection unit 543, in case the contact portion 22 moves from the negative side of the Z-axis to the positive side of the Z-axis, a contact direction which is substantially parallel with an actual direction and whose direction is opposite, is selected from the compensation table 53 by calculating the absolute value of inner product. On the other hand, grid points may be set up on the entire spherical surface of the master ball 7. Otherwise, compensation data corresponding to all the contact directions may be set up in the compensation table 53 in advance by rotating and shifting compensation data obtained concerning the respective grid points set up on one hemisphere to cover compensation data of the other hemisphere.

The area where grid points are set up is not restricted to a hemisphere, and grid points may be set up on an eighth part of the master ball 7. For example, grid points may be set up on quadrant where "x", "y" and "z" are positive to obtain compensation data, and compensation data for other quadrants may be obtained by rotating and shifting previously obtained compensation data.

In the compensation table 53 of the first embodiment, it is not required that compensation radiuses "r" be set up for respective directions. This is because the compensation radius is always "r" irrespective of the direction so long as the contact portion 22 is a perfect sphere with radius "r". When probe counter values are corrected using compensation coefficients, since (apparent) central coordinate values of the contact portion 22 can be accurately obtained, the workpiece surface can be obtained at a position which is shifted from thus accurately obtained center of the contact portion 22 by radius "r".

The contact portion 22 is not restricted to a perfect sphere, and may be in the shape of an abacus ball or disc.

In above-described embodiments, the scanning probe 2 is moved by the drive mechanism 12. On the other hand, since the scanning probe 2 may be relatively moved with respect to the workpiece W, the scanning probe 2 may be fixed while the workpiece W is moved.

In above-described embodiments, the contact portion 22 abutting on the surface of the workpiece is used as a measuring piece, and the probe sensor 24 that measures displacements brought about when the contact portion 22 is pressed by the workpiece surface is used as a detection sensor. On the other hand, the measuring piece is not necessarily required to abut on the workpiece surface, for example, the measuring piece may scan along the workpiece surface with a gap maintained therebetween. For example, the measuring piece may be a probe of the electrostatic capacitance type that has an electrode to be electrostatic-capacitory-coupled to the workpiece surface, and scans the workpiece surface with the electric potential of the electrode kept fixed. In this case, as an example, a voltage sensor that detects the electric potential of the electrode may be used as a detection sensor.

Otherwise, an optical probe that irradiates light to the workpiece surface and detects reflected light from the workpiece surface may be used. For example, an optical probe that scans the workpiece surface with a gap being the focal length of an objective lens of the optical probe maintained therebetween may be used. In this case, detection errors caused when the optical probe gets close to the workpiece surface can be corrected using the compensation table of the present invention.

In above-described embodiments, it is explained that the offset value is the distance from the center of the contact portion 22 to the workpiece surface, or the distance from the apparent center of the contact portion 22 to the workpiece surface. On the other hand, the definition of the offset value is not restricted, and the offset value may be arbitrarily defined depending on the reference point to be used in measurement. For example, the origin of the probe sensor 24 may be set up as the reference point in measurement.

Furthermore, the probe may be provided with a temperature sensor that measures the temperature of the probe. In this case, temperature difference from the reference temperature (generally, 20° C.) is obtained based on measured temperature of the probe, and temperature compensation is further performed for the compensation data using the temperature difference. As a result, further accurate compensation can be realized.

In above-described embodiments, compensation data set up in the compensation table is selected based on the contact direction unit vector calculated by the contact direction calculation unit 542, and compensation processing is performed using thus selected compensation data (compensation coefficients, compensation radiuses). On the other hand, in case there is not a direction that agrees with the contact direction unit vector in the compensation table, compensation data set up in the compensation table may be interpolated to obtain the optimum data.

For example, several measurement directions that are close to the contact direction unit vector calculated by the contact direction calculation unit 542 may be selected from the compensation table, and compensation data of thus selected measurement directions is interpolated to obtain the optimum compensation data.

The priority application Number JP2004-292970 upon which this patent application is based is hereby incorporated by reference.

What is claimed is:

1. A surface scan measuring device, comprising:
a scanning probe having a measuring piece brought into contact with or close to a workpiece surface, and a detection sensor for detecting the relative position between the measuring piece and the workpiece surface, the scanning probe scanning the workpiece surface in the state in which the relative position between the measuring piece and the workpiece surface is kept in a preset reference position range;
a motion section which relatively moves the scanning probe along the workpiece surface;
a drive sensor for detecting drive amount of the motion section; and
an analysis section which analyzes a profile of the workpiece based on detected values by the detection sensor and the drive sensor;
wherein the analysis section is provided with a compensation table stored with compensation data to correct detected values obtained by the detection sensor for respective directions along which the measuring piece measures the workpiece surface when the scanning probe scans the workpiece surface.

2. The surface scan measuring device according to claim 1, wherein the compensation table has compensation coefficients to correct detected values obtained by the detection sensor for respective directions along which the measuring piece measures the workpiece surface when the scanning probe scans the workpiece surface, and
the analysis section comprises:
a measurement direction calculation section which calculates the measurement direction along which the measuring piece measures the workpiece surface based on detected values obtained by the detection sensor;
a compensation data selection section which selects, based on the measurement direction calculated by the measurement direction calculation section, the compensation coefficient corresponding to the measurement direction from the compensation table as compensation data; and
a detection sensor value compensation section which corrects detected values detected by the detection sensor by multiplying detected values obtained by the detection sensor by the compensation data selected by the compensation data selection section.

3. The surface scan measuring device according to claim 2, wherein the compensation data selection section selects, from measurement directions set up in the compensation table, a direction that makes the absolute value of the inner product with a vector of the measurement direction calculated by the measurement direction calculation section largest.

4. The surface scan measuring device according to claim 1, wherein the compensation table has offset values from a reference point of the measuring piece to the workpiece surface for respective directions along which the measuring piece measures the workpiece surface when the scanning probe scans the workpiece surface, and
the analysis section comprises:
a measurement direction calculation section which calculates the measurement direction along which the measuring piece measures the workpiece surface based on detected values obtained by the detection sensor;
a compensation data selection section which, based on the measurement direction calculated by the measurement direction calculation section, selects the offset value corresponding to the measurement direction from the compensation table as compensation data; and
a measurement point calculation section which, using the compensation data selected by the compensation data selection section, shifts coordinate values of the reference point along the measurement direction by the compensation data to obtain the workpiece surface.

5. The surface scan measuring device according to claim 1, wherein the compensation table is set up for respective measuring pieces.

6. The surface scan measuring device according to claim 1, wherein the compensation table is arranged in the scanning probe.

7. A compensating method of a scanning probe which corrects sensor outputs being output from a detection sensor of the scanning probe that has a measuring piece brought into contact with or close to a workpiece surface, and a detection sensor for detecting a relative position between the measuring piece and the workpiece surface, the scanning probe scanning the workpiece surface, the method comprising:
- a compensation point setting up step of setting up a plurality of compensation points each having given coordinate values on the spherical surface of a master ball that is a perfect sphere having given radius and central coordinate values;
- a compensation point detection step of making the measuring piece relatively move toward the respective compensation points along the direction coming from the respective compensation points and going to the center of the master ball so as to detect the position of the compensation points;
- a compensation data calculation step of calculating compensation data to correct output values of the detection sensor by contrasting output values of the detection sensor in the compensation point detection step with coordinate values of the compensation points;
- a compensation table forming step of forming a table that stores the compensation data calculated in the compensation data calculation step by making the compensation data correspond to the direction coming from the compensation points and going to the center of the measuring piece; and
- a compensation step of reading the compensation data corresponding to a contact direction during the scanning and compensating the sensor outputs by the correction data to output a correct detection value.

8. A compensating method of a scanning probe which corrects sensor outputs being output from a detection sensor of the scanning probe that has a measuring piece brought into contact with or close to a workpiece surface, and a detection sensor for detecting a relative position between the measuring piece and the workpiece surface, the scanning probe scanning the workpiece surface, the method comprising:
- a compensation point setting up step of setting up a plurality of compensation points on a reference gauge which has a given shape, where more compensation points are set in a designated measurement direction that is designated in advance as a direction for measuring the workpiece than in the rest of the directions;
- a compensation point detection step of making the measuring piece relatively move toward the respective compensation points so as to detect the position of the compensation points;
- a compensation data calculation step of calculating compensation data to correct output values of the detection sensor by contrasting output values of the detection sensor in the compensation point detection step with coordinate values of the compensation points, the compensation data minimizing a sum of squares of measurement errors on the compensation point;
- a compensation table forming step of forming a table that stores the compensation data calculated in the compensation data calculation step; and
- a compensation step of acquiring a contact direction of the workpiece relative to the measuring piece, reading the compensation data corresponding to the contact direction during the scanning and compensating the sensor outputs by the correction data to output a correct detection value.

* * * * *